United States Patent
van Pol et al.

(10) Patent No.: US 12,146,971 B2
(45) Date of Patent: Nov. 19, 2024

(54) SYSTEMS AND METHODS FOR DETERMINING ABSOLUTE VELOCITY AND POSITION OF A SENSOR DEVICE FOR MEASURING FLUID AND FLUID CONDUIT PROPERTIES

(71) Applicant: INGU Solutions Inc., Calgary (CA)

(72) Inventors: Anouk van Pol, Calgary (CA); Bryan Peng, Calgary (CA); Johannes Hubertus Gerardus van Pol, Calgary (CA)

(73) Assignee: INGU Solutions Inc., Calgary (CA)

( * ) Notice: Subject to any disclaimer, the term of this patent is extended or adjusted under 35 U.S.C. 154(b) by 307 days.

(21) Appl. No.: 17/733,613

(22) Filed: Apr. 29, 2022

(65) Prior Publication Data

US 2023/0099157 A1 Mar. 30, 2023

Related U.S. Application Data

(60) Provisional application No. 63/248,826, filed on Sep. 27, 2021.

(51) Int. Cl.
*F16L 55/00* (2006.01)
*F16L 55/48* (2006.01)
(Continued)

(52) U.S. Cl.
CPC .............. *G01S 3/786* (2013.01); *F16L 55/48* (2013.01); *G01S 3/7803* (2013.01); *G01S 3/781* (2013.01)

(58) Field of Classification Search
CPC ........ G01S 3/786; G01S 3/781; G01S 3/7803; F16L 55/48
See application file for complete search history.

(56) References Cited

U.S. PATENT DOCUMENTS

2013/0055789 A1* 3/2013 Targosz ................. G01N 27/82
73/7
2013/0199272 A1* 8/2013 Khalifa ................. G01M 3/005
73/40.5 A
(Continued)

FOREIGN PATENT DOCUMENTS

CN 102927451 A * 2/2013
CN 103038610 A * 4/2013 ............. G01F 1/708
(Continued)

OTHER PUBLICATIONS

European Patent Office, Extended European Search Report for EP 22020197.4, Jan. 30, 2023.

*Primary Examiner* — Jamel E Williams
(74) *Attorney, Agent, or Firm* — Own Innovation; Kent C. Howe; James W. Hinton

(57) ABSTRACT

Systems, methods, and devices for fluid conduit inspection using absolute velocity of a sensor device are provided. The method includes: receiving sensor data collected by a sensor device during a measurement run from an interior of the fluid conduit while traveling along a length of the fluid conduit, the sensor device including a first magnetometer and a second magnetometer each having a fixed position in the sensor device, the fixed positions defining a separation distance between the first magnetometer and second magnetometer, the sensor data including magnetic flux data comprising first magnetic flux data collected by the first magnetometer and second magnetic flux data collected by the second magnetometer; determining a time delay between when a magnetic signal is present in the first magnetic flux data and when the magnetic signal is present in the second magnetic flux data; determining an absolute velocity of the sensor device.

11 Claims, 14 Drawing Sheets

(51) Int. Cl.
*G01S 3/78* (2006.01)
*G01S 3/781* (2006.01)
*G01S 3/786* (2006.01)

(56) References Cited

U.S. PATENT DOCUMENTS

2019/0368665 A1\* 12/2019 van Pol .................. G01B 7/293
2020/0209093 A1\* 7/2020 van Pol .................. G01L 19/149
2020/0217698 A1\* 7/2020 Ciobanu ................. G01F 1/586

FOREIGN PATENT DOCUMENTS

| EP | 3677889 A1 \* | 7/2020 | ............... F17D 5/06 |
| WO | WO-2006081671 A1 \* | 8/2006 | ............... F16L 55/38 |
| WO | WO-2017197505 A1 \* | 11/2017 | ............. G01N 27/87 |

\* cited by examiner

SYSTEMS AND METHODS FOR DETERMINING ABSOLUTE VELOCITY AND POSITION OF A SENSOR DEVICE FOR MEASURING FLUID AND FLUID CONDUIT PROPERTIES

TECHNICAL FIELD

The following relates generally to fluid conduit inspection, and more particularly to determining an absolute velocity and position of a sensor device in a fluid conduit as part of a fluid conduit inspection operation.

INTRODUCTION

Sensor data can be acquired from the interior of a fluid conduit, such as a pipeline, to provide information about the fluid and the fluid conduit, such as its condition (e.g., presence of a leak), by inserting a sensor device into the fluid conduit and collecting measurements over a length of the conduit. The sensor device can be free floating or not free floating (e.g., traveling along the wall of the conduit or tethered to a device that travels along the wall of the conduit). For such sensor measurements to have meaning, it is important to know where the measurements were recorded in the conduit (i.e., the position of the sensor device when a measurement was recorded). In other words, it is useful to know a position or location of the sensor device over time during the measurement run through the fluid conduit. The location of the sensor device when a measurement is recorded can then be correlated to a location along the fluid conduit. In this way, the fluid conduit can be inspected using the sensor device and features of interest, such as a leak or deposit, can be located.

An approach for accurately determining location of a sensor device in a fluid conduit over the course of a measurement run along a length of the fluid conduit is desired. Such an approach is desired for free floating sensor devices and non-free floating sensor devices.

Various approaches to determining sensor device location exist but have various shortcomings and/or lack of applicability to both free floating and non-free floating sensor device implementations.

If the fluid conduit is entirely above ground, a global positioning system (GPS) can be used together with an inertial navigation unit to accurately determine position of the sensor device. The use of GPS, however, is not suitable for fluid conduits that are wholly or partially underground, and thus approaches using GPS such as the foregoing combination of GPS and inertial navigation unit are not suitable for fluid conduits that are wholly or partially underground. Additionally, GPS typically does not work in steel or other metallic material and liquid, both of which are often combined in a fluid conduit.

In some cases, the sensor device may be attached to a pig that rides along the interior of the fluid conduit. The pig includes odometer wheels which roll along the wall of the conduit. The odometer wheels are used to track the distance traveled by the pig (and thus the sensor device attached to the pig).

In other cases, the sensor device may be a standalone device (i.e., untethered, unmounted) configured to roll along the bottom of the fluid conduit. The sensor device records how many times the device rolls over its length to get a sense of the distance traveled and thus the position of the sensor device. This approach requires the sensor device to travel along the wall of the conduit, which can create unacceptable background noise which can either negatively impact the accuracy of the sensor readings or require that such background noise be removed. Such devices can also introduce a friction component as a result of traveling along the wall, which can make gathering insights from sensor data into fluid or fluid conduit properties more difficult.

In yet other cases, the sensor device may be tethered to another sensor device using a length of wire and the length of the wire is then used along with the sensor measurements to determine position. Such an approach requires multiple sensor devices and a complicated tethering setup that may be difficult to implement in some pipeline conditions.

Further, none of the above approaches are suitable for a free-floating sensor device implementation and for a non-free floating sensor device implementation that does not make use of the methods described above. For example, a non-free floating sensor device implementation in which the sensor device is attached to a cleaning pig cannot make use of the above methods since cleaning pigs do not have wheels or other features required for the other methods described above.

In free floating sensor device applications, the sensor device may include an inertial measurement unit ("IMU"). Using only the IMU to determine position of the sensor device, such as through determining acceleration and velocity of the sensor device via the IMU measurements, is ineffective, however, as the drift in micro-electromechanical system (MEMS) device such as the IMU is too large to provide an accurate sense of where the device is located.

Accordingly, there is a need for improved systems, methods, and sensor devices for fluid conduit inspection that overcome at least some of the disadvantages of existing approaches to determining sensor device location.

SUMMARY

A method of fluid conduit inspection is provided. The method includes: receiving sensor data collected by a sensor device during a measurement run from an interior of a fluid conduit while traveling along a length of the fluid conduit, the sensor device including a first magnetometer and a second magnetometer each having a fixed position in the sensor device, the fixed positions defining a separation distance between the first magnetometer and second magnetometer, the sensor data including magnetic flux data comprising first magnetic flux data collected by the first magnetometer and second magnetic flux data collected by the second magnetometer; determining a time delay between when a magnetic signal is present in the first magnetic flux data and when the magnetic signal is present in the second magnetic flux data; determining an absolute velocity of the sensor device using the separation distance of the first magnetometer and the second magnetometer and the determined time delay; performing the determining the time delay and the determining the absolute velocity for a plurality of times over the measurement run to obtain a plurality of absolute velocity values for the sensor device over the measurement run; and determining a property of the fluid conduit or a fluid flowing in the fluid conduit using the absolute velocity values.

The method may further include collecting the sensor data from the interior of the fluid conduit using the sensor device.

Each of the plurality of absolute velocity values may have an associated time value, and the method may further include determining a distance traveled by the sensor device as a function of time using the absolute velocity values and the associated time values.

The method may further include using the absolute velocity values and determined distance traveled in combination with additional sensor data about the fluid or fluid conduit to optimize the determined distance travelled.

The method may further include using the distance traveled as a function of time to determine a sensor measurement position for a particular sensor measurement in the sensor data by corresponding a time value associated with the sensor measurement with a time value from the distance traveled as a function of time, the sensor measurement position indicating where along the length of the fluid conduit the sensor measurement was recorded, and using the sensor measurement position to determine the property of the fluid conduit or a fluid flowing in the fluid conduit.

The sensor device may have an undefined orientation as the sensor device travels along the length of the fluid conduit, the sensor data may further include acceleration data collected by an accelerometer and third magnetic flux data collected by a third magnetometer in the sensor device, and the method may further include, prior to determining the time delay, determining an orientation of the sensor device using the acceleration data and the magnetic flux data and rotating a frame of reference of the sensor device using the determined orientation.

Determining the orientation of the sensor device and rotating the frame of reference of the sensor device may further include: determining a vertical plane orientation of the sensor device towards earth gravity field using the acceleration data and filtering out a force of the earth gravity field; rotating the frame of reference of the sensor device such that gravity points down to establish direction in the vertical plane using a continuous factor of the earth gravity force; determining a horizontal plane orientation using the relative strengths of the same magnetic signal in the first, second, and third magnetic flux data or using the time delay of the same magnetic signal between the first, second, and third magnetic flux data: and performing a coordinate frame transformation to point the horizontal plane orientation forward.

The sensor device may be a free floating sensor device, and the sensor data may have been collected while the free floating sensor device freely flowed with the flow of the fluid in the fluid conduit.

The sensor data may have been collected by the sensor device while the sensor device was attached in a defined orientation to a pigging device traveling along an inner surface of the fluid conduit.

The property of the fluid conduit or the fluid flowing in the fluid conduit may be a flow property of the fluid flowing in the fluid conduit.

The property of the fluid conduit or the fluid flowing in the fluid conduit may be a structural anomaly in the fluid conduit.

The sensor data may include any one or more of acoustic data, pressure data, temperature data, and the sensor measurement may be any one or more of an acoustic measurement, a pressure measurement, a temperature measurement, or a magnetic flux measurement.

Determining the orientation of the sensor device and rotating the frame of reference of the sensor device may include transforming the sensor data from a sensor device frame of reference in which the sensor data was collected by the sensor device to a fluid conduit frame of reference.

Transforming the sensor data may include performing a coordinate frame transformation.

The method may further include determining presence and location of a magnetic marker along the fluid conduit having a characteristic and recognizable magnetic signature by detecting the magnetic signature in the magnetic flux data and optimizing the determined distance traveled using the determined location of the magnetic marker.

The method may further include determining a location of an elevation change in the fluid conduit by referencing pressure data in the sensor data collected by a pressure sensor of the sensor device against reference elevation data for a geographic location of the fluid conduit and optimizing the determined distance traveled using the location of the determined elevation change.

Determining the time delay between when the magnetic signal is present in the first magnetic flux data and when the magnetic signal is present in the second magnetic flux data may include aligning the first and second magnetic flux data using time warping to identify aligned magnetic flux data points and determining a time delay between aligned magnetic flux data points.

A computer system for fluid conduit inspection is also provided. The computer system includes a memory storing: sensor data collected by a sensor device during a measurement run from an interior of a fluid conduit while traveling along a length of the fluid conduit, the sensor data including: magnetic flux data comprising first magnetic flux data collected by a first magnetometer of the sensor device and second magnetic flux data collected by a second magnetometer of the sensor device, each of the first and second magnetometers having a fixed position in the sensor device; and magnetometer separation distance data corresponding to a separation distance between the first and second magnetometers. The computer system also includes a processor in communication with the memory. The processor is configured to: determine a plurality of time delay values over the measurement run, each time delay value determined by identifying a time delay between when a magnetic signal is present in the first magnetic flux data and when the magnetic signal is present in the second magnetic flux data; determine an absolute velocity of the sensor device for each of the plurality of time delay values using the magnetometer separation distance data and the respective time delay value to obtain a plurality of absolute velocity values for the sensor device over the measurement run, each of the plurality of absolute velocity values having associated time data indicating a time at which the sensor device had the respective absolute velocity value; and generate distance traveled data from the absolute velocity values and associated time data, the distance traveled data indicating a distance traveled by the sensor device during the measurement run at a particular time.

The processor may be further configured to optimize the distance traveled data using additional sensor data about the fluid or the fluid conduit.

The processor may be further configured to use the distance traveled as a function of time to determine a sensor measurement position for a particular sensor measurement in the sensor data from the distance traveled data by corresponding a time value associated with the sensor measurement with a time value from the distance traveled as a function of time, the sensor measurement position indicating where along the length of the fluid conduit the sensor measurement was recorded.

The sensor data may further include acceleration data collected by an accelerometer and third magnetic flux data collected by a third magnetometer in the sensor device, and the processor may be further configured to determine an orientation of the sensor device using the acceleration data and the magnetic flux data and rotate a frame of reference of the sensor device using the determined orientation.

The processor may determine the orientation of the sensor device and rotate the frame of reference of the sensor device by: determining a vertical plane orientation of the sensor device towards earth gravity force using the acceleration data and filtering out a force of the earth gravity force; rotating the frame of reference of the sensor device such that gravity points down to establish direction in the vertical plane using a continuous factor of the earth gravity force; determining a horizontal plane orientation using the relative strengths of the same magnetic signal in the first, second, and third magnetic flux data or using the time delay of the same magnetic signal between the first, second, and third magnetic flux data; and performing a coordinate frame transformation to point the horizontal plane orientation forward.

The sensor device may be a free floating sensor device, and the sensor data may have been collected while the free floating sensor device freely flowed with the flow of the fluid in the fluid conduit.

The sensor data may have been collected by the sensor device while the sensor device was attached in a defined orientation to a pigging device traveling along an inner surface of the fluid conduit.

The sensor data may include any one or more of acoustic data, pressure data, temperature data, and the sensor measurement may be any one or more of an acoustic measurement, a pressure measurement, a temperature measurement, or a magnetic flux measurement.

The sensor data may further include acceleration data collected by an accelerometer and third magnetic flux data collected by a third magnetometer in the sensor device, and the processor may be configured to: determine a vertical orientation of the sensor device using the acceleration data and a horizontal orientation of the sensor device using the magnetic flux data; adjust a frame of reference of the sensor device using the determined vertical and horizontal orientations; and determine the plurality of time delay values using the adjusted frame of reference.

The processor may be further configured to map a sensor device position to a sensor measurement collected by the sensor device using the distance traveled data, the sensor device position indicating a position along the fluid conduit at which the sensor device collected the sensor measurement.

The sensor data may include pressure data collected by a pressure sensor of the sensor device and the processor may be further configured to optimize the distance traveled data using the pressure data and reference elevation data for a geographic location of the fluid conduit.

The processor may be further configured to retrieve the reference elevation data from an external computing device via a data communication network.

The processor may be further configured to transform the sensor data from a sensor device reference frame in which the sensor data was collected to a fluid conduit reference frame using acceleration data collected by an accelerometer of the sensor device and the magnetic flux data.

The processor may be further configured to determine presence and location of a magnetic marker along the fluid conduit having a characteristic and recognizable magnetic signature by detecting the magnetic signature in the magnetic flux data and optimize the distance traveled data using the determined location of the magnetic marker.

The magnetic marker may be a joint joining two segments of the fluid conduit together.

The processor may determine the plurality of time delay values over the measurement run by aligning the first magnetic flux data and the second magnetic flux data using a time warping technique to identify aligned magnetic flux data points and determining the time delay value between aligned magnetic flux data points.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
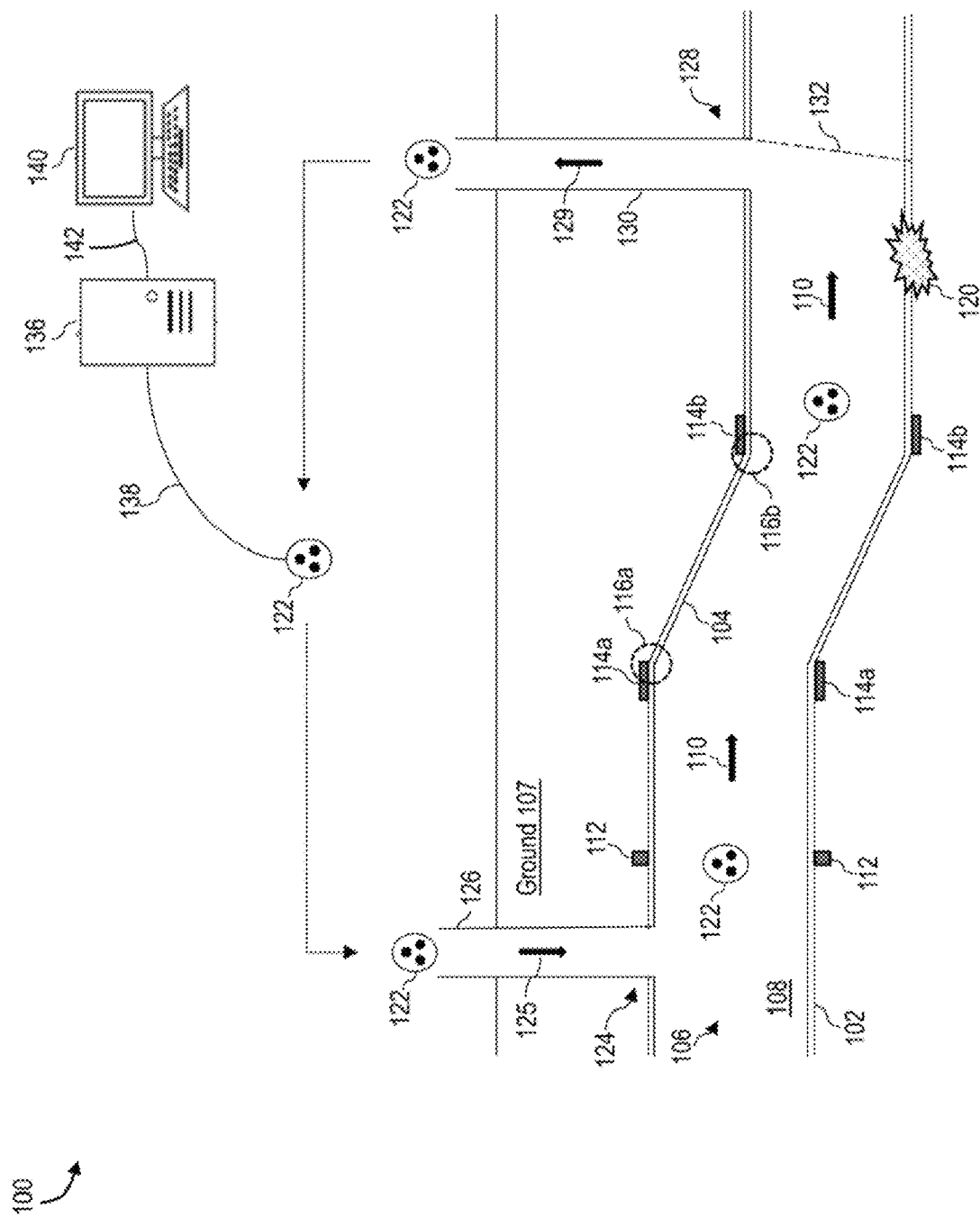
FIG. 1 is a schematic diagram of a fluid conduit inspection system, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary, a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The following relates generally to fluid conduit inspection, and more particularly to fluid conduit inspection using passive magnetometry.

In one aspect, the present disclosure provides systems and methods for determining absolute velocity of a sensor device travelling in a fluid conduit. In some examples, the sensor device may be attached or mounted to a device, such as a pig, that travels along an inner surface of the fluid conduit. In other examples, the sensor device may be free floating. The free-floating sensor device may have an undefined orientation as it travels with the flow of the fluid. The method allows for determining absolute velocity of the sensor device without use of components such as GPS sensors. The method may be used in fluid conduit inspection operations in which at least a portion of the fluid conduit is underground. The method may also be used in fluid conduits that are fully above ground. The determined absolute velocity of the sensor device can be used to determine a position of the sensor device in the fluid conduit. Once the position of the sensor device along the length of the fluid conduit is known, such position information can be used to identify the location along the length of the fluid conduit at which a particular sensor measurement was recorded. The method may determine absolute velocity of the sensor device with good accuracy, which may enable a more accurate determination of distance traveled by the sensor device and sensor device position for a particular sensor measurement.

The present disclosure leverages the repeatability of magnetic flux measurements recorded in multiple magnetometers of the sensor device. The use of magnetic flux data collected via multiple magnetometers in the sensor device may provide a low cost approach to determining absolute velocity and sensor position of the sensor device.

The high repeatability of the magnetic flux data collected by the magnetometers of the sensor device in the fluid conduit provides that the similar magnetic flux data (magnetic spectra) can be collected by the at least two magnetometers in the sensor device but the measurements will be offset from one another based on a time-delay. The time-delay between magnetometer measurements is a function of the distance between the at least two magnetometers and the orientation of the magnetometers with respect to the fluid conduit. Accordingly, where the distance between the at least two magnetometers is defined (i.e. predetermined and known), the time-delay may be a function of orientation of the sensor device.

Further, embodiments of the present disclosure using a free-floating sensor, or data collected by a free floating sensor, may provide advantages in fluid and fluid conduit inspection. A free-floating sensor device can go with the flow of the fluid in the fluid conduit such that, if there is a riser or vertical section, the sensor device can follow the flow and avoid getting stuck at the bottom. The free-floating sensor device may not produce background noise that is present in sensor devices that travel along the wall of a fluid conduit. This lack of background noise can improve fluid and fluid conduit property analyses, such as leak detection. For example, where the sensor device includes a pressure sensor for measuring pressure of a fluid in the fluid conduit, the pressure measured by the free-floating sensor device more accurately reflects the pressure of the fluid (as there is no friction force component introduced from the travel along the wall of the conduit). In this way, the free-floating sensor device may provide better actual measurement of physical phenomena in the fluid conduit.

Referring now to FIG. 1, shown therein is a schematic illustration of a fluid conduit inspection system 100, according to an embodiment.

The system 100 includes a fluid conduit 102. Only a portion of the fluid conduit 102 is shown in FIG. 1.

The fluid conduit 102 includes a fluid conduit wall 104 which encloses a fluid conduit interior 106. The conduit interior 106 (also referred to herein as "inside the fluid conduit" or "the inside of the fluid conduit") refers to a space enclosed by the fluid conduit wall 104.

The fluid conduit 102 may include a ferromagnetic material. The ferromagnetic material may be any ferromagnetic material used for pipe wall or fittings. The ferromagnetic material may be any one or more of steel, stainless steel, carbon steel, ductile iron, and cast iron. The ferromagnetic material may be the fluid conduit wall 104, or a layer, portion, or component thereof. The ferromagnetic material may be a fluid conduit feature, such as a joint (e.g., joints 114a, 114b below) that is a component of the fluid conduit 102. The fluid conduit 102 may be composed entirely or partially of a ferromagnetic material. The fluid conduit 102 may be partially ferromagnetic (e.g., a non-metallic conduit) with one or more metallic conduit features (e.g., joints, tees, etc.). The fluid conduit 102 may comprise multiple layers where only a subset of the layers includes ferromagnetic material. For example, the fluid conduit 102 may include ferromagnetic material only at fluid conduit features, such as joints or tees (e.g., a non-metallic fluid conduit having steel joints or tees). The fluid conduit wall 104 may include ferromagnetic material. The fluid conduit wall 104 may be composed, for example, of any one or more of steel, stainless steel, carbon steel, cast iron, flexsteel, HDPE, fiberspar, and ductile iron.

In the present example of system 100, the fluid conduit 102 is located below ground 107. In other examples, the fluid conduit 102 may be located above ground, or may have above ground 107 and below ground 107 segments. In other examples, the fluid conduit 102, or segments thereof, may be located below water (but not necessarily below ground), such as in an offshore implementation.

The interior 106 of the fluid conduit 102 holds and conveys a fluid 108. The fluid flows along a direction of flow 110. The fluid 108 may be a liquid, a gas, or a combination of liquid and gas (e.g., multiphase flow). The fluid 108 may be, for example, crude oil, oil emulsion, natural gas, sour gas, produced water, waste water, or fresh water.

The fluid conduit 102 includes a plurality of conduit features. The conduit features include a weld 112, joints 114a and 114b, and bends 116a and 116b. The number and types of conduit features present in the fluid conduit 102 may vary from pipeline to pipeline. Conduit features 112, 114a, 114b, 116a, 116b are shown merely as examples of conduit features that may be present.

The fluid conduit 102 includes an anomaly 120. The anomaly 120 may be a volumetric metal loss, a deposit, a leak, etc. A deposit is inside the conduit and not part of the wall 104.

The system 100 also includes a sensor device 122 for collecting magnetic flux data from the interior 106 of the fluid conduit 102.

The sensor device 122 includes a sensor component, a data storage component (e.g. memory) for storing sensor data collected by the sensor component, and a communication interface for transferring data from the sensor device.

The sensor component includes a plurality of magnetometers for collecting the magnetic flux data. One or more of the plurality of magnetometers may be a component of an inertial measurement unit ("IMU") sensor. The sensor component may include additional sensors such as any one or more of an accelerometer, a pressure sensor, a gyroscope, an acoustic sensor, and a temperature sensor for collecting other types of sensor data. The other types of sensor data may be used in optimizing certain distance or absolute velocity determinations made by the system (e.g., through sensor fusion techniques), or more generally in optimizing determinations of conduit condition or sensor device location. In an embodiment, the sensor component includes a plurality of magnetometers and an accelerometer. The accelerometer may be a triaxial accelerometer. The accelerometer may be a component of an IMU.

The sensor component, data storage component, and communication interface are disposed in an interior compartment of the sensor device 122. The interior compartment is enclosed by an outer housing of the sensor device 122. The housing may be a two-part capsule including first and second capsule portions which are joinable to enclose the interior compartment (and provide fluid-tight containment thereto) and which are separable to provide access to the interior compartment. In some cases, certain components (e.g. sensors, communication data transfer interface) may be exposed to the exterior of the sensor device 122, such as through an aperture in an outer housing of the sensor device 122.

In some cases, the sensor device 122 may measure the magnetic flux of the Earth magnetic field. Such an approach may be used, for example, in cases where the fluid conduit 102 is non-metallic.

The system 100 includes a sensor device insertion point 124 for inserting the sensor device 122 into the fluid conduit 102 along insertion direction 125. The insertion point 124 includes a device guide 126 for guiding the sensor device 122 into the fluid conduit interior 106 at the start of a measurement run. The device guide 126 may be continuous with the fluid conduit interior 106 such that insertion of the sensor device 122 into the device guide 126 facilitates insertion of the sensor device 122 into the fluid conduit 102. In system 100, the device guide extends from the fluid conduit wall 104 at the insertion point 124 to a location above ground 107.

The system 100 includes a sensor device extraction point 128 for extracting the sensor device 122 from the fluid conduit 102 along extraction direction 129. The extraction point 128 includes a device guide 130 for guiding the sensor device 122 out of the fluid conduit interior 106 at the end of a measurement run. The device guide 130 may be continuous with the fluid conduit interior 106 such that the sensor device 122 can be extracted from the fluid conduit 102. The device guide extends from the fluid conduit wall 104 at the extraction point 128 to a location above ground 107.

In other embodiments, the sensor device 122 may be inserted and extracted using different insertion and extraction techniques.

The system 100 includes a device stopping mechanism 132 for stopping the flow of the sensor device 122 while permitting the continued flow of the fluid 108 in the fluid conduit 102 along flow direction 110. The device stopping mechanism is positioned in the interior 106 of the fluid conduit 102 at or near the extraction point 128. Once stopped, the sensor device 122 can be more easily removed at the extraction point 128.

The distance from the insertion point to the extraction point may constitute a measurement run when traveled by the sensor device 122. The sensor device 122 may perform multiple measurement runs (e.g. first measurement run, second measurement run, etc.). Similarly, a second sensor device may be inserted into the fluid conduit 102 to perform one or more measurement runs. In some cases, measurement runs of multiple sensor devices 122 may overlap in that the multiple sensor devices 122 may be in the fluid conduit 102 at the same time but at different points along the measurement run.

The system 100 also includes a data processing system 136. The data processing system includes a memory storing computer-executable instructions (e.g., software) that, when executed by a processor of the data processing system, cause the data processing system to perform various data processing and visualization functions described herein. The data processing system 136 may include one or more computing and/or data storage devices. The data processing system 136 may include one or more data science suitable computers (e.g., running Python or other programming language suitable for performing data science tasks, sufficient memory, GPUs, etc.).

Once the sensor device 122 is extracted from the fluid conduit 102, the sensor data (which includes the magnetic flux data) stored in memory of the sensor device 122 is transferred to the data processing system 136. In some cases, the sensor data may be transferred to the data processing system 136 indirectly through an intermediary data transfer device (not shown), which may temporarily store the transferred sensor data.

To facilitate sensor data transfer, a data transfer connection 138 is established between the sensor device 122 and the data processing system 136. The data transfer connection 138 may be wireless (e.g., WiFi, Bluetooth) or wired (e.g., data transfer cable, USB). The sensor device 122 may be connected to the data processing system 136 via a network, such as a local area network or wide area network (e.g. the Internet). Accordingly, the data processing system 136 may be located at or near the site of the fluid conduit 102 (onsite) or may be remote.

The sensor data is transferred from the sensor device 122 to the data processing system 136 via the data transfer connection 138. The transfer may initiate automatically or may require a user input.

In an embodiment, the system 100 may include a readout system including a readout unit and a data storage system in addition to the data processing device 136. The readout unit is configured to load data from the sensor device 122 to the storage system. The data is then copied to the data processing system 136 for processing. Such configuration may advantageously maintain integrity of the source data.

The data processing system 136 processes the received sensor data to perform any one or more of determining an orientation of the sensor device 122, determining an absolute velocity of the sensor device 122, determining a distance traveled of the sensor device 122 using the absolute velocity, and determining a sensor device position for a particular sensor measurement using the distance traveled.

The data processing system 136 may be configured to retrieve, collect, or access reference elevation data corresponding to a geographical location of the fluid conduit 102. The reference elevation data may be stored locally at the data processing system 136 or retrieved from an external source, for example via a data communication network. The data processing system 136 may convert reference elevation data retrieved or received from an external source into a format appropriate for processing by the data processing system 136. In one embodiment, the reference elevation data may be Google Earth elevation profile data. The data processing system 136 may be configured to map an elevation profile for the fluid conduit using the reference elevation data. The data processing system 136 may check the elevation profile against pressure data collected by a pressure sensor of the sensor device 122. The pressure data may provide a "pressure profile" for the fluid conduit and may be combined with reference elevation data to optimize one or more determinations or calculations made by the data processing system 136, such as a distanced traveled by the sensor device using an absolute velocity of the sensor device 122 determined by the data processing device 136 (as further described herein).

Generally, an elevation change in the fluid conduit 102 leads to a pressure change in the hydrostatic pressure of the fluid in the fluid conduit 102. The sensor device 122 may include a pressure sensor for collecting pressure measurements as the sensor device 122 travels along the fluid conduit 102. Changes in hydrostatic pressure can be detected in the pressure data. Elevation changes in the fluid conduit 102 can be inferred from hydrostatic pressure changes reflected in the pressure data (as changes in elevation correspond with changes in hydrostatic pressure). The data processing system 136 may be configured to analyze a pressure profile of the fluid conduit 102 (i.e., a series of pressure measurements collected along a length of the fluid conduit) and detect pressure measurements that may correspond to different elevations or changes in elevation. The data processing system 136 may compare the pressure data to reference elevation data. The data processing system 136 may map or overlay the pressure data or profile onto reference elevation data (or vice versa) or combine or otherwise fuse the pressure data and reference elevation data for mapping the fluid conduit 102. The combined use of the pressure data and reference elevation data by the data processing system 136 provides a means of mapping the fluid conduit such as through obtaining one or more marking points (e.g., elevation changes) along the fluid conduit 102 reflected in the processed data. This approach may be particularly effective in cases where the fluid conduit includes a lot of elevation changes.

In some embodiments, the data processing system 136 may be configured to analyze magnetic data collected by one or more magnetic sensors of the sensor device 122 and detect a magnetic signature (e.g., a magnetic signal or plurality of magnetic data points) characteristic of or associated with a joint (e.g. 114a, 114b) of the fluid conduit 102. Magnetic measurements in the magnetic data may be associated with a timestamp indicating a time at which a particular measurement was collected. In doing so, the data processing system 136 can identify magnetic measurements (data points in the magnetic data) corresponding to joints and map out a location for each detected joint along the fluid conduit 102. This may be achieved by determining the absolute velocity and distance traveled of the sensor device 122, such as described herein, and ultimately a measurement position (e.g., measurement position data 856 of FIG. 8) for the magnetic data points that correspond to the joint magnetic signature.

The data processing system 136 may also analyze the received sensor data to determine the presence of an anomaly or conduit feature. The received sensor data used in the determination may be magnetic sensor data (i.e., the magnetic flux data) or may be non-magnetic sensor data (e.g. pressure data, acoustic data, temperature data, etc.). For example, the data processing system 136 may analyze magnetic flux data, acoustic data, or pressure data to identify the presence of a leak.

The data processing system 136 may map certain sensor data to a determined sensor device position using a common time component (e.g., a common time stamp associated with the sensor device position and the sensor data). This can provide insight into where particular sensor measurements were recorded along the length of the fluid conduit 102. Such information may be particularly useful in identifying a location along the length of the fluid conduit 102 where a leak or other anomaly or conduit feature may be present based on analysis of the sensor data by the data processing system 136.

The data processing system may implement one or more outlier detection algorithms for detecting outliers in the sensor data that correspond to a localized anomaly or a conduit feature. For example, an outlier detection algorithm may be configured to identify outliers in the magnetic flux data that correspond to metal loss. In another example, an outlier detection algorithm may be configured to identify outliers in the magnetic flux data that correspond to any one or more of a steel bore, a casing, a weld, a flange, and a valve. In an embodiment, the outlier detection process may be automated.

The data processing system 136 generates a conduit inspection output. The conduit inspection output may include the absolute velocity and sensor device position determinations performed by the data processing system 136. The inclusion of the absolute velocity and sensor device position determinations may improve the conduit inspection output (e.g. digital report) by providing this additional information. The conduit inspection output may be a user interface including a visualization or other representation of the data which is presented at a display device 140. The display device 140 is communicatively connected to the data processing system 136 via a data transfer connection 142. The data transfer connection 142 may be wired or wireless. The display device 140 may be a display of the data processing system 136 or may be a separate device including a display. In cases where the display device 140 is a separate processing device, the display device may be communicatively connected to the data processing system 136 via a local connection, such as a local area network, or a remote connection, such as a wide area network (e.g. the Internet). The display 140 may be configured to present an online interface or electronic document (e.g., PDF). In some cases, the conduit inspection output may be emailed from the data processing system 136 to a recipient for presentation on the display device 140.

The sensor device 122 is free-floating and flows with the fluid flow 110. The sensor device 122 may be designed or configured to be neutrally buoyant in the fluid 108.

The sensor device 122 in FIG. 1 is a free-floating sensor device. The free-floating sensor device is neutrally buoyant in the fluid in which it is flowing and flows with the fluid as the fluid travels through the fluid conduit. In other embodiments, the sensor device 122 may be attached to a device that is configured to contact and ride along an interior surface of the fluid conduit (and thus not used as a free-floating sensor device). For example, the sensor device may be attached to a cleaning pig or similar device. In such cases, In embodiments where the sensor device 122 is a free-floating object, the sensor device 122 may match the buoyancy of the liquid in the fluid conduit 102 and allow for the sensor device, collecting sensor data as it flows, to have a constant flow in the timeline that matches the constant flow rate of the liquid (due to the sensor device 122 being neutrally buoyant). In other words, being neutrally buoyant and free-floating, the sensor device 122 is carried with the fluid in the fluid conduit at the flow rate of the fluid (moving at liquid speed), enabling time to be an accurate proxy for distance traveled. This allows, for example, magnetic signals recorded by multiple magnetometers having a set separation distance in the sensor device to be compared and used in determining absolute velocity of the sensor device 122. In contrast, if the sensor device 122 were configured to roll along the inner surface of the fluid conduit 102 or scrape the inner surface, the sensor device 122 would move relative to the liquid in the fluid conduit 102 (e.g. whether due to different friction forces or obstructions in the flow path), which would prevent the use of time as a good indicator of distance travelled.

For example, the sensor device 122 may include a weight for adjusting the mass of the sensor device so the sensor device is neutrally buoyant in the fluid 108. The characteristics of the weight, including whether or not one is used, may depend on the configuration needed for the density of a particular liquid in the fluid conduit 102. In some cases, the interior compartment of the sensor device 122 may include one or more weight-receiving compartments or grooves each configured to receive a specific gravity-adjusting weight. The specific gravity-adjusting weights may be specifically constructed to fit into and be retained in the weight-receiving compartment or groove. The weight-receiving compartment or groove may be configured to retain the specific-gravity adjusting weight such that when the sensor device 122 free floats with a liquid the specific gravity-adjusting weight is retained in the weight-receiving compartment or groove. In some cases, the weight receiving compartment or groove may be built into an interior surface of the outer housing. The specific gravity-adjusting weight may be specifically weighted such that when its weight is combined with an overall weight of the sensor device 122 without the weight, the combined weight reaches a weight or specific gravity suitable for free floating the sensor device in a specific liquid (i.e., having a certain specific gravity). It will be understood that multiple such weights (and multiple weight receiving compartments or grooves) could be used to enable the same sensor device to be free floating in liquids having different specific gravities. For example, the non-weighted sensor device may be constructed to have a weight enabling the sensor device to be neutrally buoyant in water and include one or more weight receiving compartments or grooves for receiving one or more specific gravity-adjusting weights to enable the sensor device to match the specific gravity of and be neutrally buoyant in oil.

In other embodiments, the sensor device 122 may be attached to a device, such as a cleaning pig, which travels along an inner surface of the fluid conduit wall 104 (and thus not be free-floating). The device may be configured to travel inside and make sealing contact with the fluid conduit 102. The sensor device 122 may be attached to the device in such a way that the sensor device is in the center of the fluid conduit 102. The term "center" as used in this context refers to a position within the fluid conduit interior 106 where the sensor device 122 has the same or approximately the same distance to each part of the fluid conduit wall 104 in that section of the fluid conduit 104. The center may be at or near the geometrical center. The sensor device 122 may be attached to the other device such that the sensor device maintains a constant orientation relative to the device to which it is attached as the device and the sensor device travel through the fluid conduit. An example of a manner in which the sensor device 122 may be connected to the pig (or other device) is described in United States Patent Application Publication number US2019/0368665A1, U.S. Ser. No. 16/424,643, which is hereby incorporated by reference in its entirety.

The sensor device 122 measures magnetic flux (not shown) inside the fluid conduit 102 resulting from residual magnetization of the fluid conduit 102. Generally, ferromagnetic materials, which may be used as part of fluid conduit 102, become magnetic during the manufacturing process, installation process, and over time. This is referred to as residual magnetization and is measured by the sensor device 122 and the system 100. The residual magnetization results from exposure of the fluid conduit 102 (i.e., the fluid conduit wall material) to an external magnetic field (e.g., the Earth's magnetic field).

The magnetic flux present in the fluid conduit 102 may be a result of a combination of factors which depend on the entire history of the fluid conduit and may go all the way back to the manufacturing of fluid conduit wall 104 materials (e.g., pipe spools) before shipment for a construction project.

For example, differences in seam type (seamless, longitudinal or spiral seam pipe), grade, or wall thickness lead to differences in the measured magnetic flux. Then, during construction, the heat from welding and stresses from the cold-working of field bends, for example, can increase the magnetic flux in a fluid conduit at those locations. Finally, changes to the fluid conduit during the operation of the fluid conduit can affect the magnetic flux in the fluid conduit which could include any repairs, (magnetic) inspections, corrosion, or applied stresses. All these factors produce a pipeline magnetization which shows complex structures and can be difficult to precisely assess without any baseline information on the fluid conduit and its history.

In practice, however, it is observed that the magnetic flux in pipelines shows repeatable patterns and structures (i.e., most pipelines have similar looking magnetic flux). Continued exposure of the pipeline to the Earth magnetic field can change the overall magnetic flux but may not alter the patterns and structure of the magnetic flux. In other words, if the pattern of the magnetic flux changes between measurement runs, the assumption is that something has changed in the pipeline condition (e.g., degradation of the pipeline's condition, such as due to metal loss from corrosion or applied stresses). Repeated future measurements of a fluid conduit are therefore expected to even better identify changes in a fluid conduit 102's magnetic flux and baseline data (from previous measurements) can be used to more accurately and precisely assess changes in the fluid conduit 102 condition (where changes would generally indicate corrosion or other pipeline anomalies). As larger volumes of data are acquired, it becomes possible to accurately label features and anomalies present in a pipeline during an initial screening (baseline data).

Figure 2:
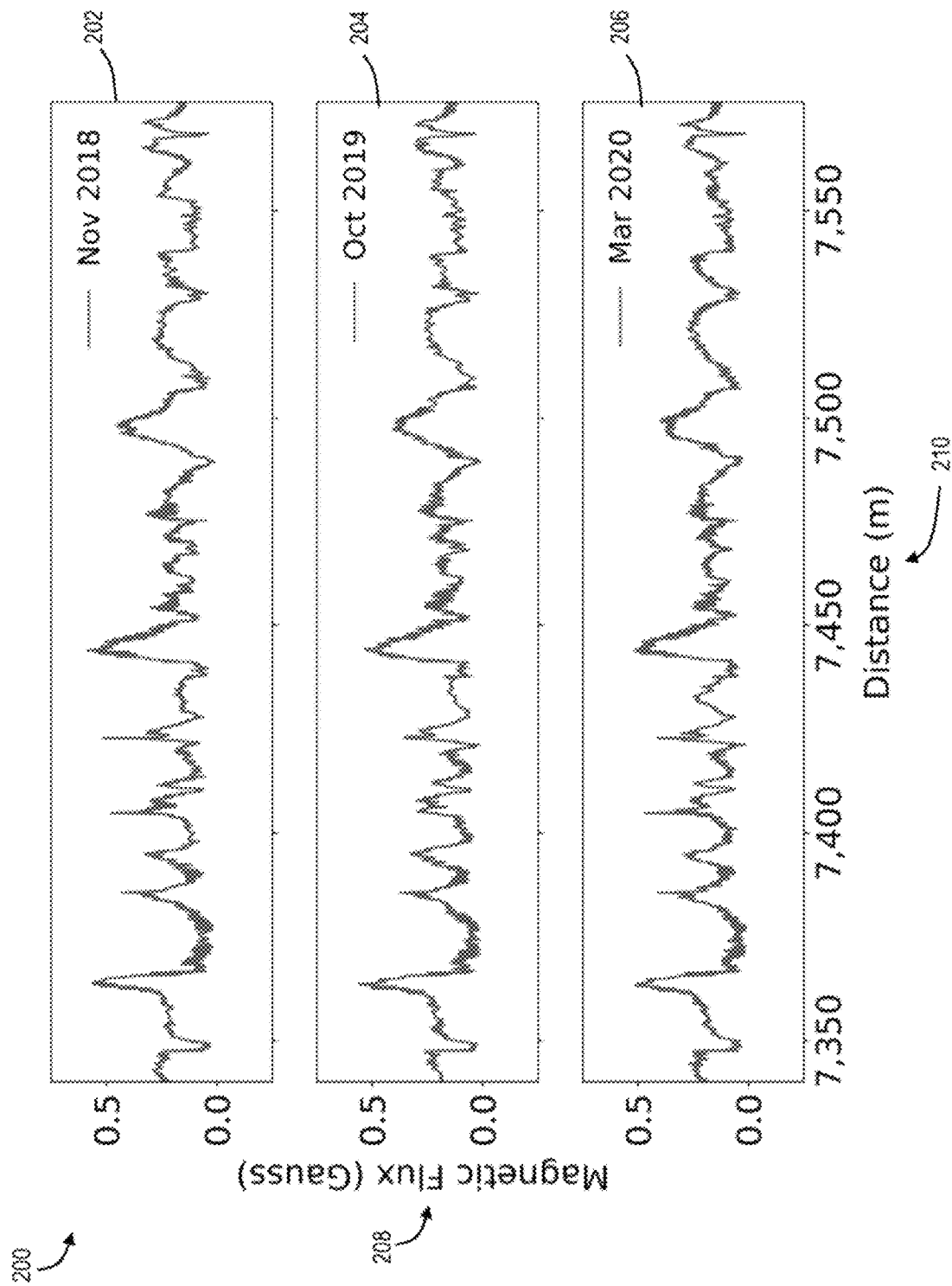
FIG. 2 is a graphical representation of magnetic flux data collected by a sensor device of the present disclosure over a length of fluid conduit during three different measurement runs, illustrating general repeatability of the magnetic flux data.

An example of the repeatability of the magnetic flux data recorded by the sensor device 122 is shown in FIG. 2. FIG. 2 illustrates a graphical representation 200 of magnetic flux data collected from a fluid conduit with a sensor device (i.e., as in the system 100 of FIG. 1) over three different measurement runs 202, 204, 206. The three measurement runs correspond to the same stretch of the fluid conduit.

The three measurement runs include a first measurement run 202 performed in November 2018, a second measurement run 204 performed in October 2019, and a third measurement run 206 performed in March of 2020. The measurement runs 202, 204, 206 are illustrated as plots of magnetic flux 208 against distance 210. The distance 210 corresponds to the distance traveled by the sensor device along the fluid conduit.

The repeatability of the magnetic flux data collected by the sensor device 122, which is visible in FIG. 2 by the similarity in plots across measurement runs 202, 204, 206, is leveraged in the various systems and methods for absolute velocity and sensor position determination described herein. For example, magnetic signatures represented in the magnetic flux data can recorded by a plurality of spaced-apart magnetometers in the sensor device 222 at a time delay, and the magnetic flux data, time delay, and spacing of the magnetometers used to perform subsequent operations (e.g. determining sensor device orientation, absolute velocity, distance traveled, sensor measurement location).

Figure 3:
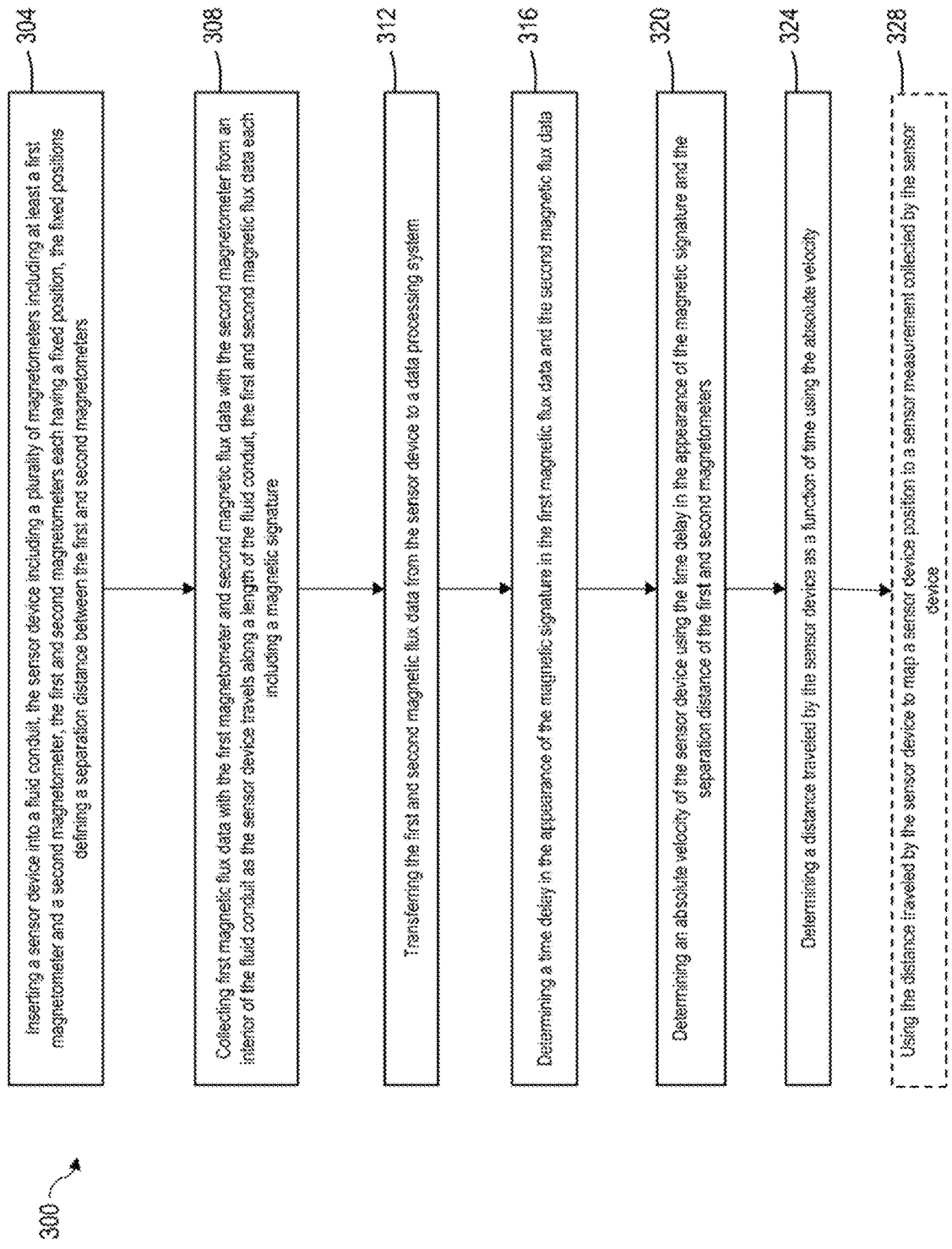
FIG. 3 is a flowchart of a method of determining absolute velocity and distance traveled of a sensor device traveling in a fluid conduit, according to an embodiment.

Referring now to FIG. 3, shown therein is a method 300 of determining absolute velocity and distance traveled of a sensor device traveling in a fluid conduit, according to an embodiment. The method 300 may be performed using the system 100 of FIG. 1. The fluid in the fluid conduit may be liquid and/or gas.

The method 300 may be performed for a sensor device that has a defined (or predetermined) orientation as the sensor device travels along the fluid conduit. For example, the method 300 may be performed for a sensor device that is attached to a pig or other device that travels along an inner surface of the fluid conduit. The sensor device orientation with respect to the fluid conduit may remain constant as the sensor device travels through the fluid conduit. The defined orientation of the sensor device is in contrast to an undefined orientation, such as in the case of a free-floating sensor device where the orientation of the sensor device may change as it flows with the fluid flow.

At 304, a sensor device is inserted into an interior of a fluid conduit. The sensor device may be the sensor device 122 of FIG. 1.

The sensor device includes a plurality of magnetic sensors (or magnetometers) including at least a first magnetometer and a second magnetometer. In some embodiments, the sensor device may include more than two magnetometers.

The first and second magnetometers may be disposed in an interior compartment of the sensor device. The first magnetometer and the second magnetometer each have a fixed position with respect to the sensor device and each other. The fixed positions of the first and second magnetometers define a separation distance between the first and second magnetometers. In embodiments where the sensor device includes additional magnetometers, such additional magnetometers each have a fixed position with respect to the sensor device which defines a separation distance between the respective magnetometer and at least one other of the plurality of magnetometers. The orientation of the sensor device when attached to the pig (or other device) is such that the separation distance is along a longitudinal axis of the fluid conduit (i.e. along the length of the conduit).

The sensor device may include other types of sensors (i.e., non-magnetic sensors) for collecting sensor data other than magnetic data. The other sensor data may be used to determine a property of the fluid conduit. The plurality of magnetic sensors and the non-magnetic sensors may together form a sensor subsystem for collecting sensor data (magnetic and non-magnetic). The sensor device also includes a data storage (e.g., memory) for storing the collected sensor data.

The sensor device also includes a communication interface for facilitating transfer of the sensor data from the data storage of the sensor device to a receiving device. The receiving device may be a data processing device or a data transfer/storage device. The communication interface may be configured to transfer sensor data using wired and/or wireless data transfer techniques.

At 308, first magnetic flux data and second magnetic flux data are collected by the first magnetometer and the second magnetometer, respectively, from an interior of the fluid conduit as the sensor device travels along a length of the fluid conduit. Where additional magnetometers are used, additional magnetic flux data is collected by those magnetometers (e.g., third magnetic flux data by a third magnetometer, etc.).

Generally, the magnetometers collect the magnetic flux data as the sensor device travels through the fluid conduit. The magnetic flux data includes a plurality of magnetic flux measurements measured and recorded over a time period. The time period may correspond to a measurement run or a portion thereof. The sensor device may record sub-centimeter precision magnetic flux measurements over a length of the fluid conduit. The magnetometers may record magnetic flux measurements at a predefined interval. In an embodiment, the sensor device may record 400 measurements per second. In some embodiments, the sensor device may record 1000 measurements per second or more.

Each magnetic measurement collected by the plurality of magnetic sensors includes an associated time component that is recorded along with the corresponding magnetic measurement. Generally, the time component may be used to identify when a particular measurement was recorded relative to one or more other measurements. The time components for multiple measurements may thus be used to generate a time series of magnetic sensor data (or other sensor data, as the case may be). The time component may be recorded by a timer. The timer may be a component of the respective magnetic sensor collecting the magnetic data or may be a separate component of the sensor device. When the timer is a separate component, the timer may be used to record time components (time data) for more than one sensor in the sensor device. The associated time components of magnetic measurements (or other sensor measurements, as the case may be) may be stored as time data in the data storage of the sensor device. It should be noted that non-magnetic sensor measurements collected by non-magnetic sensors may have associated time components in a similar manner.

The first magnetic flux data and the second magnetic flux data each record and include a magnetic signal. The magnetic signal may be considered a "magnetic signature" and relates to the repeatability of the magnetic flux data collected by the sensor device, such as described above in reference to FIG. 2. The magnetic signature is present in the first magnetic flux data and second magnetic flux data at different times.

The magnetic signal or signature is magnetic flux data that is specific to the fluid conduit and which, when recorded by multiple magnetometers (e.g., first and second magnetometers), can be used to correspond or align magnetic flux data recorded by the plurality of magnetometers. For example, the magnetic signal can be used to correspond or align the first and second magnetic flux data such that a time delay in the appearance or measurement of the magnetic signal can be determined.

In some cases, the magnetic signature may be considered the entirety of the magnetic flux data collected during the measurement run.

At 312, the first magnetic flux data and the second magnetic flux data are transferred from the sensor device to a data processing system. The data processing system may be the data processing system 136 of FIG. 1.

In some embodiments, the sensor device may be extracted from the fluid conduit to transfer the collected magnetic flux data to the data processing system through a wired or wireless connection. For example, the sensor device may include an outer capsule that can be opened to provide access to an interior compartment of the sensor device containing the data storage.

In some embodiments, the magnetic flux data may be transferred from the sensor device to the data processing system while the sensor device is inside the fluid conduit.

The first and second magnetic flux data may be transferred to the data processing system indirectly through an intermediary data transfer device. For example, the sensor device may be connected to the intermediary data transfer device via wired or wireless connection and the first and second magnetic flux data may be transferred to the intermediary data transfer device. The intermediary data transfer device may then transfer the first and second magnetic flux data to the data processing system via wired or wireless connection.

Data transfer from the sensor device to the data processing system (or intermediary device) may occur automatically, for example upon a data transfer-capable connection to the recipient device being established, or may occur in response to a user input (e.g. manual transfer). In some cases, the sensor device and/or the recipient device may include a processor configured to automatically transfer or extract sensor data, respectively, from the sensor device (e.g., from the data storage) to the recipient device when a data transfer connection is established. In some cases, the sensor device and/or the recipient device may be configured to automatically establish the data transfer connection.

In an embodiment, a data storage of the sensor device may be read out (e.g. by a memory card reader or the like) to transfer data to the external data processing system.

Non-magnetic sensor data collected by the sensor device may also be transferred to the data processing system at 312. The non-magnetic sensor data may be transferred in a similar manner.

Once the magnetic flux data is received by the data processing system (e.g., whether directly or through an intermediary device), the magnetic flux data (and other sensor data) can be processed by the data processing system and various characteristics of the sensor device and fluid conduit can be determined.

At 316, a time delay in the appearance of the magnetic signature in the first and second magnetic flux data is determined. As the first and second magnetometers are spaced apart (i.e., at the separation distance), the magnetic signature should be recorded in each of the first and second magnetic flux data but at a time delay (e.g. the time it takes for the magnetic signal to appear in a rear sensor compared to a front sensor). The determination is performed by the data processing device.

It should be understood that a plurality of time delay determinations can be performed at 316 for a plurality of magnetic flux measurements (or data points). This may be done by corresponding or aligning magnetic flux measurements or data points in the first and second magnetic flux data using the magnetic signature (or signatures). In this way, time delay information can be accumulated over a length of the sensor measurement run (e.g. the entire length). The corresponding or aligning of magnetic flux measurements using the repeatable magnetic signals may be performed automatically by the data processing device.

For example, the magnetic signature measured by two of the same sensors at approximately the same time (they may be only fractions of a second apart) is the same. In an embodiment, a simple approach to determining time delay is employed which includes identifying a characteristic signal in the data collected by the first sensor (e.g. a peak), identifying the characteristic signal in the data collected by the second sensor, and then calculating the time difference (e.g. by subtracting associated sensor measurement times) between when the characteristic signal appears in the first sensor data and when the characteristic signal appears in the second sensor data. In another embodiment, a more complex approach may be used wherein a secondary time axis is created. The signals or spectra from the first and second sensors are then time warped together using a time warping technique such that the data overlaps (e.g., 100% or close to 100% overlap). For example, the time warping may include mapping each magnetic data point in a second data set (from the second sensor device) to a corresponding magnetic data point in a first data set (from the first sensor device). Then, at any point the difference between the measured time and the time warped time is determined and represents the time difference in detecting the signals.

At 320, an absolute velocity of the sensor device is determined using the time delay determined at 316 and the separation distance of the first and second magnetometers. The determination is performed by the data processing device.

The absolute velocity can be obtained by dividing the separation distance of the first and second magnetometers by the time delay from 316 (i.e., the time it takes the signal to appear in the second magnetometer compared to the first magnetometer).

The absolute velocity may be associated with a time component, such as described above in reference to 308. The time component may be obtained or derived from the sensor data (e.g., from the magnetic flux data). The time component indicates a time of the measurement run at which the sensor device had the corresponding absolute velocity. The time component may enable the absolute velocity to be arranged in a time series along with other similarly determined absolute velocity values.

Depending on the method of time delay determination used, the absolute velocity may be represented as velocities at certain locations or a continuous velocity profile.

At 324, a distance traveled by the sensor device as a function of time is determined using the absolute velocity from 320. The determination is performed by the data processing device.

Using the time series of absolute velocity values from 320, the absolute velocity as a function of time can be integrated to obtain a distance traveled by the sensor device as a function of time or to correct for sudden velocity changes at specific locations throughout the measurement run or fluid conduit. For example, the absolute velocity may be used to determine distance throughout the entire fluid conduit or, in some cases, the distance from joint to joint may already be known and the absolute velocity may then be used to become more precise in the distance throughout a spool (between two joints) or throughout a certain section of the fluid conduit. The distance traveled by the sensor device as a function of time may be stored as a time series of distance traveled values which can be referenced to obtain a sensor device distance traveled (i.e., position or location) at a particular time using the associated time component.

Optionally, at 328, a sensor device position may be mapped to a sensor measurement (e.g., sensor data point) collected by the sensor device using the distance traveled data determined at 324. A starting position of the sensor device along the fluid conduit may be known (and stored in the system) which can be used to determine actual position of the sensor device along the fluid conduit. The sensor measurement may be a magnetic sensor measurement or a non-magnetic sensor measurement. This may allow a determination of a sensor device position along the fluid conduit for a particular sensor measurement. The determination or mapping is performed by the data processing device.

For example, the sensor device may include an acoustic sensor and measure and record acoustic data from the interior of the fluid conduit using the acoustic sensor during the measurement run. The acoustic measurements include an associated time component (time data) indicating when an acoustic measurement was recorded. Certain acoustic measurements recorded may indicate the presence of a leak in the fluid conduit. In order to determine where along the fluid conduit the acoustic measurements were recorded (and thus where the leak is present), the position of the sensor device at the time the acoustic measurements were recorded can be used. As each of the acoustic measurements and distance traveled data have associated time components, the time component of the relevant acoustic measurement can be determined, and the time component used to obtain a distance traveled value from the distance traveled data. The distance traveled value indicates the distance traveled at the time the acoustic measurement was sensed, and thus indicates a location along the length of the conduit corresponding to the acoustic measurement. The distance traveled data from 324 can be similarly used for mapping other sensor data to a sensor device position (and fluid conduit location).

While method 300 refers to first and second magnetometers and first and second magnetic flux data, it is to be understood that one or more additional magnetometers may be used to collect additional magnetic flux data and the magnetic flux data measured by the additional magnetometers may be processed in a similar manner.

It should be further understood that the determinations at 316, 320, and 324 can be performed continuously (i.e., over the length of the measurement run, for numerous data points) using the unique signatures present in the magnetic flux measurements. This is further supported by the fact that it is extremely unlikely that two similar, but distinct magnetic signals will occur within the time frame corresponding to the time delay. In this way, time delay, absolute velocity, and distance traveled for the sensor device can be determined over the length of the measurement run.

Figure 4:
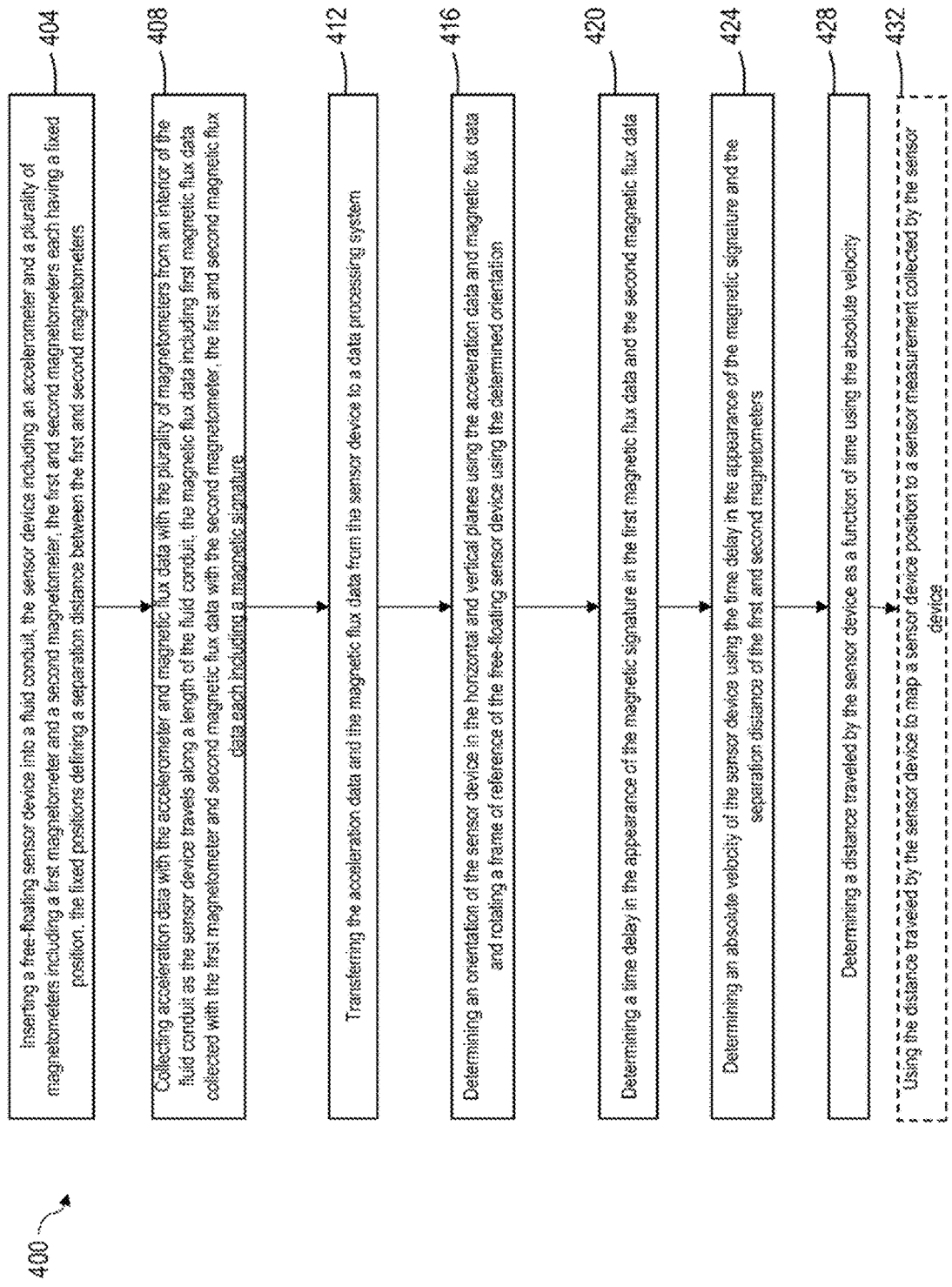
FIG. 4 is a flowchart of a method for determining absolute velocity and distance traveled of a free-floating sensor device in a fluid conduit, according to an embodiment.

Referring now to FIG. 4, shown therein is a method 400 of determining absolute velocity and distance traveled of a free-floating sensor device in a fluid conduit, according to an embodiment.

The method 400 may be performed using the system 100 of FIG. 1.

The method 400 can be used where the sensor device has an undefined orientation (e.g., free floating) as the sensor device travels along the fluid conduit.

Steps 404-412 and 420-432 of method 400 are similar to steps 304-312 and 316-328 of method 300 of FIG. 3, respectively, and certain details may not be repeated here.

At 404, a sensor device is inserted into the fluid conduit. The sensor device is free-floating. The sensor device may be the sensor device 122 of FIG. 1.

The sensor device includes an accelerometer and a plurality of magnetometers. The accelerometer may be a component of an IMU. One or more of the plurality of magnetometers may be a component of an IMU. In an embodiment, the accelerometer and one of the plurality of magnetometers may be components of the same IMU. The magnetometers may be triaxial magnetometers. The accelerometer may be a triaxial accelerometer.

The accelerometer may be located at or near a geometric center of the sensor device. The accelerometer may be mounted to a sensor platform. The accelerometer may be mounted at or near the center of the sensor platform.

The plurality of magnetometers includes at least three magnetometers. The three magnetometers are not on the same line (i.e., they should form a triangle). For example the three magnetometers may be arranged in the same plane in a triangle shape. In an embodiment, the plurality of magnetometers includes a first magnetometer, a second magnetometer, a third magnetometer, and a fourth magnetometer. The fourth magnetometer may be a component of an IMU along with the accelerometer. The first, second, and third magnetometers may be arranged in the same plane in a triangle shape (as in the three-magnetometer embodiment)

and the fourth magnetometer may be positioned out of the plane of the other three magnetometers.

The plurality of magnetometers each have a fixed position relative to the sensor device. For example, the magnetometers may be arranged at fixed positions (along with the accelerometer) on a sensor platform disposed in the sensor device. The fixed positions define a separation distance between the plurality of magnetometers. For example, first and second magnetometers each have fixed positions which define a separation distance between the first and second magnetometers.

At 408, sensor data is collected from an interior of the fluid conduit as the sensor device travels along a length of the fluid conduit.

The sensor data includes magnetic flux data collected by each of the plurality of magnetometers. The magnetic flux data includes first magnetic flux data, second magnetic flux data, and third magnetic flux data corresponding to magnetic flux data sensed by the first, second, and third magnetometers, respectively.

The sensor data also includes acceleration data measured by the accelerometer.

At 412, the magnetic flux data and the acceleration data are transferred from the sensor device to a data processing system. Other sensor data collected by other sensors may also be transferred.

At 416, an orientation of the sensor device in the vertical and horizontal planes is determined using the acceleration data and the magnetic flux data. A frame of reference of the sensor device is adjusted (rotated) using the determined orientation. The determination and frame of reference rotation is performed by the data processing device.

As the free-floating sensor device has an undefined orientation as the sensor device flows through the fluid conduit, the orientation determination step at 416 is used to define an orientation of the sensor device such that subsequent steps of the method 400 (time delay, absolute velocity, distance traveled determinations) can be performed in a manner similar to method 300 of FIG. 3.

Determining the vertical and horizontal orientation of the sensor device may include a two-step process. First, a vertical orientation may be determined using acceleration data. The acceleration data may be from a triaxial accelerometer. The ratio of gravity over the three axes of the triaxial accelerometer can be used to orient the sensor device in the vertical direction such that gravity (earth gravity signal) as determined from the three sets of acceleration data points down. Next, with the vertical orientation determined, the presence of a characteristic or recognizable magnetic signal in the magnetic data of the different magnetometers can be detected and the time at which the signal appears (or the order in which the signal appears) compared. For example, the characteristic signal may be a magnetic signal associated with a magnetic marker along the conduit, such as a weld. The magnetic marker may have been detected using sensor data collected by the sensor device. This information can be used to determine the orientation of the sensor device in the horizontal plane and rotate the frame of reference of the sensor device (or the sensor board/platform of the sensor device on which the magnetometers are disposed). In this way, the sensor data collected by the sensor device can be transformed from the sensor device frame of reference (in which it is collected) to a fluid conduit frame of reference.

In some cases, the determined orientation of the sensor device may be used to optimize other sensor data from which determinations about the fluid or fluid conduit may be made. For example, data collected by a gyroscope of the sensor device may be used to determine bends in the fluid conduit. Gyroscope data may indicate sensed rotation; however, such sensed rotation signal may correspond to a bend in the fluid conduit or to the rotation of the sensor device itself. The determined orientation of the sensor device may be used to optimize the rotation data such that the two types of rotation signals can be distinguished and to correctly identify bends can be correctly identified (and sensor device rotation unrelated to bends disregarded).

Figure 5:
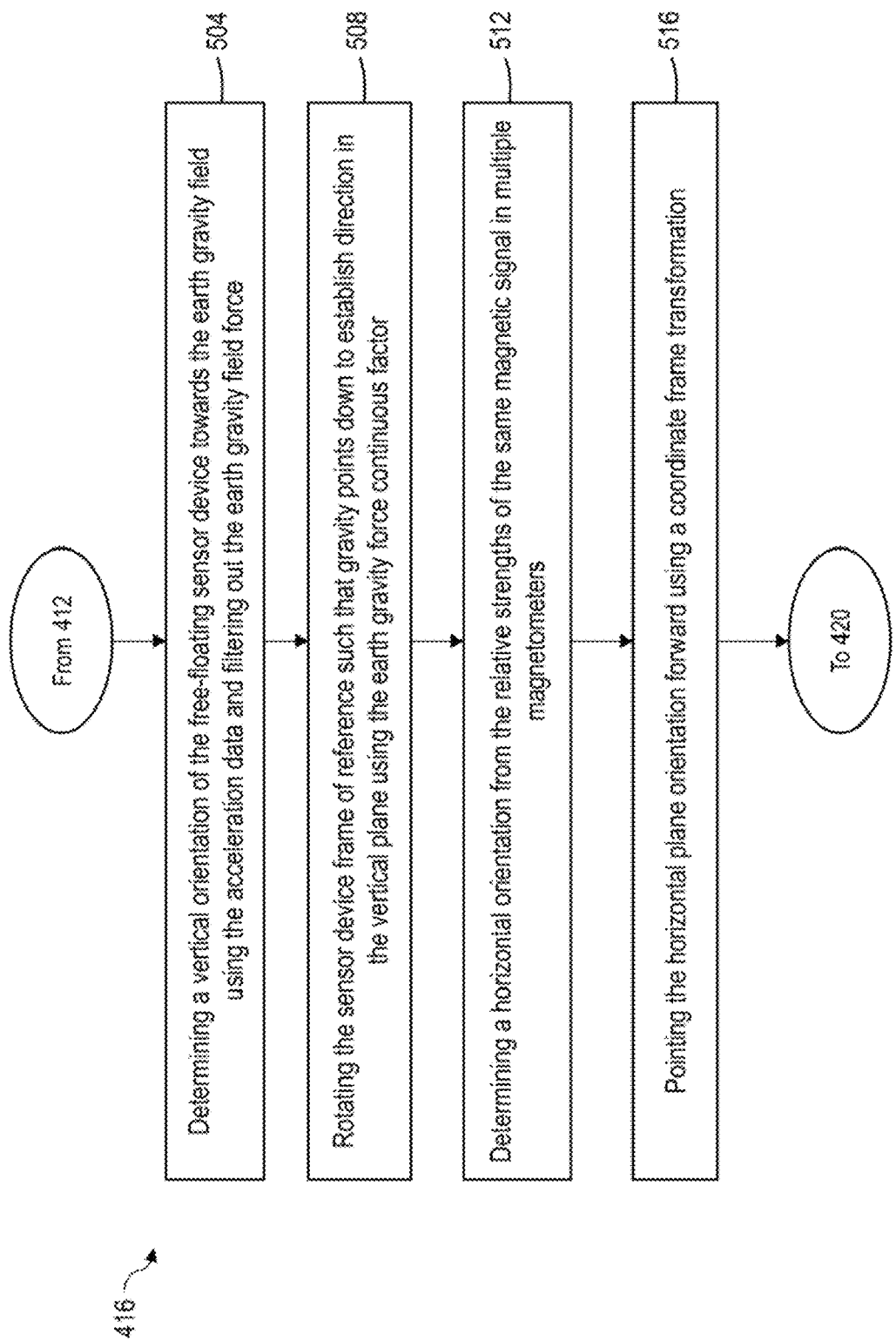
FIG. 5 is a flowchart of a method for determining an orientation of a free-floating sensor device for use in determining an absolute velocity of the sensor device, according to an embodiment.

Referring now to FIG. 5, shown therein is the step 416 of FIG. 4 in greater detail, according to an embodiment.

At 504, a vertical orientation of the free-floating sensor device towards the earth gravity field is determined using the acceleration data and filtering out the earth gravity field force.

Generally, the orientation towards the earth gravity field can be determined using the accelerometer. Earth gravity has a continuous force on the accelerometer that, depending on the orientation of the sensor device, is split over the three axes. Because all other forces are assumed to be evenly spread, this force from the earth gravity field represents a continuous factor and can be identified and filtered out of the data. Gravity will appear in the three axes of a triaxial accelerometer, and the relative strength allows for the determination of the vertical orientation of the sensor device.

At 508, using the determined vertical orientation from 504, a frame of reference of the sensor device can be rotated in such a way that gravity points down. Once this frame of reference rotation has been performed, the direction in the vertical plane is known.

At this stage, the magnetic signals (i.e. magnetic signature) will be measured in multiple magnetometers, and present in the respective magnetic flux data, with different strengths (relative strength). This feature of the magnetic signals relates to the repeatability of the magnetic measurements previously described herein.

At 512, a horizontal orientation of the sensor device in the horizontal plane can be determined from the relative strengths of the same magnetic signal in the multiple magnetometers or the time delays between the magnetic signal in the multiple magnetometers.

At 516, the orientation in the horizontal plane determined at 512 is pointed forward through a coordinate frame transformation. Generally, the sensor data collected by the sensor device is collected in the sensor device frame of reference. The sensor data may be transformed or rotated from the sensor device frame of reference to a fluid conduit frame of reference to enable further processing as described herein.

The steps of 504-516 are performed by the data processing device.

The determination of horizontal orientation may follow a similar approach to the determination of vertical orientation. For example, gravity appears in the three axes of the accelerometer and the relative strength of the gravitational force enables vertical orientation determination of the sensor device. A similar approach may be used on a magnetic signal spread out over the different axes of the magnetometer if a particular signal should appear predominantly in one axis (e.g. a weld), In other cases, a combination of the three magnetometers and the relative time difference between signals recorded in each magnetometer enables a similar analysis. For example, if the same magnetic signature is detected at the same time in two magnetometers, it can be determined that the two magnetometers are perpendicular to the pipeline wall and the magnetic signal from the third magnetometer can be used to determine velocity. In a similar way, where a signal is detected in the magnetic flux data of the three magnetometers at different times, an equation can be resolved using the known relative positions of the magnetometers in the sensor device (i.e. on the sensor platform).

Referring again to FIG. 4, at 420, a time delay in the appearance of the magnetic signature in magnetic flux data measured in the first and second magnetic flux data is determined. The determination includes compensating for the orientation corrections performed at 416.

At 424, an absolute velocity of the sensor device is determined using the time delay determined at 420 and the separation distance of the first and second magnetometers. In some cases, the absolute velocity of the sensor device may be used to determine flow properties of the fluid in the fluid conduit (as the sensor device travels with the flow, the absolute velocity can be related to the flow of the fluid). Such determination of flow properties may be determined by the data processing device. To do this in a free-floating sensor implementation, the sensor device is rotated from a sensor device frame of reference to a fluid conduit frame of reference. This may be performed computationally by the data processing device.

At 428, a distance traveled by the sensor device as a function of time is determined using the absolute velocity from 424.

Optionally, at 432, a sensor device position may be mapped to a sensor measurement (e.g. sensor data point) collected by the sensor device using the distance traveled data determined at 428.

Steps 420, 424, 428, and 432 may be performed similarly to steps 316, 320, 324, and 328 of FIG. 3. Certain details of such steps are not repeated here.

Figure 6:
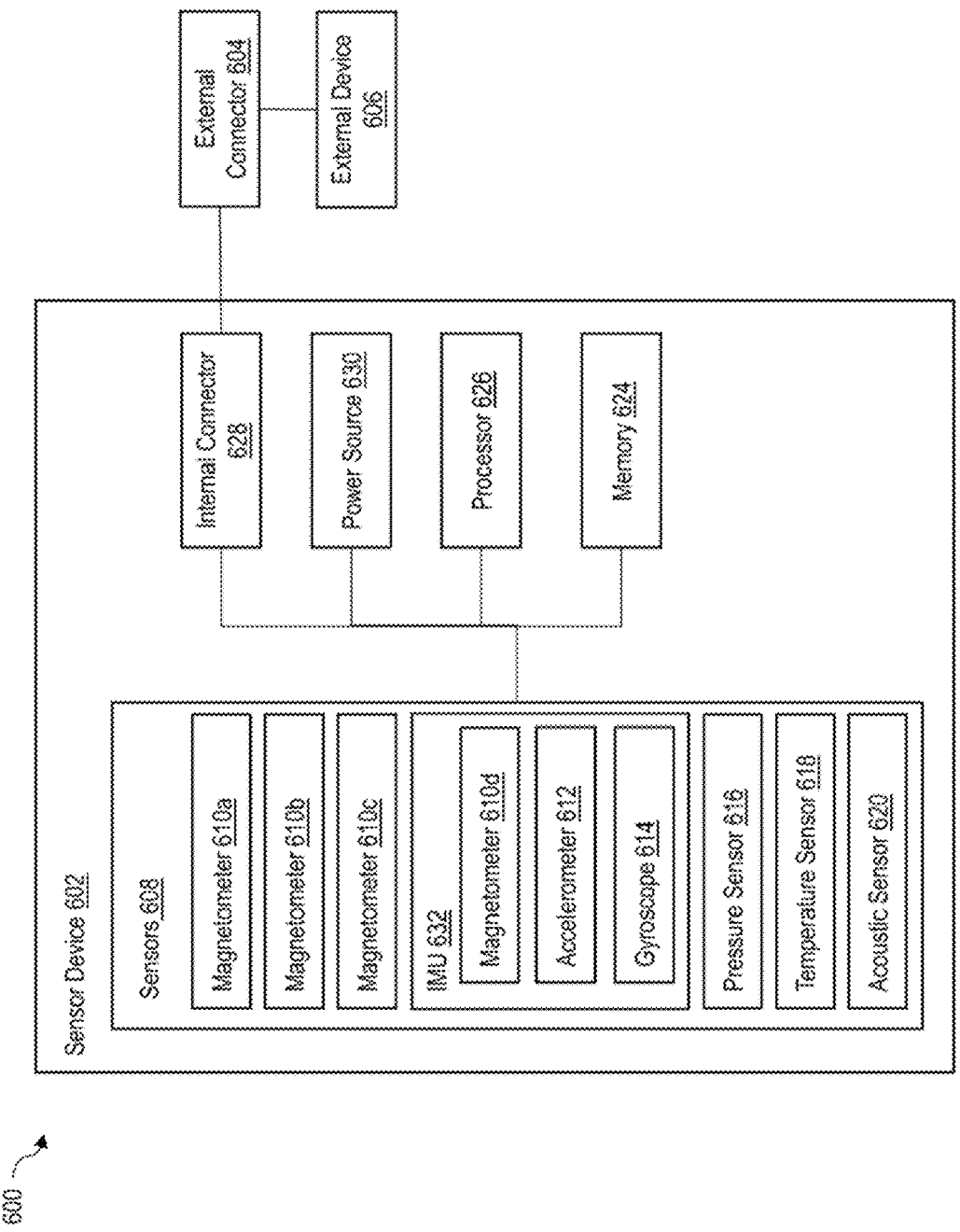
FIG. 6 is a block diagram of system for determining absolute velocity and position of a sensor device in a fluid conduit, according to an embodiment.

Referring now to FIG. 6, shown therein is a system 600 for fluid conduit inspection, according to an embodiment.

The system 600 includes a sensor device 602 for collecting sensor data including magnetic flux data from inside a fluid conduit. The sensor device 602 may be the sensor device 122 of FIG. 1. The sensor device 602 may be used as a free-floating sensor device. The sensor device 602 may also be used as a non-free-floating device, such as by attaching or mounting the sensor device 602 to a pig or similar device.

The system also includes an external connector 604 for communicating with an external device 606. The external device may be a data processing device, such as the data processing system 136 of FIG. 1, or an intermediary data transfer device.

The external connector 604 may be a cradle configured to receive the sensor device, a cable (e.g., USB cable), a memory card reader for receiving a memory card installed on the sensor device, or any other means known in the art for transmission of data.

In other embodiments, the system 600 may not include the external connector 604 and data transfer may occur directly between the sensor device 602 and the external device 606 via a wireless communication (e.g., wireless readout via wireless communication method).

The sensor device 602 includes a sensor 608 for taking measurements about a property of the fluid or fluid conduit from inside the fluid conduit.

The sensor 608 includes a plurality of magnetometers 610a, 610b, 610c, and 610d. The magnetometers may be referred to collectively as magnetometers 610 and generically as magnetometer 610. The sensor 608 may include fewer or additional magnetometers 610. For example, in an embodiment, the sensor 608 may include only three magnetometers or a fifth magnetometer. The magnetometer 610 may be a triaxial magnetometer. The magnetometer 610 collects measurements of magnetic flux from inside the fluid conduit.

The sensor 608 may also include any one or more of a triaxial accelerometer 612, a triaxial gyroscope 614, a pressure sensor 616, a temperature sensor 618, and an acoustic sensor 620. The magnetometer 610d, accelerometer 612, and gyroscope 614 may be components of an IMU 632. In other cases, the magnetometer 610d, accelerometer 612, and gyroscope 614 may be separate sensors, or only the accelerometer 612 and gyroscope 614 may be components of an IMU (with the magnetometer 610d being a sensor separate from the IMU).

In other embodiments, the sensor 608 may include other sensors, such as an ultrasonic sensor, as well.

In other embodiments, the sensor device 602 can have more than one of each of the accelerometer 612, gyroscope 614, pressure sensor 616, temperature sensor 618 and acoustic sensor 620. For example, when the sensor device 602 has multiple accelerometers 612 and gyroscopes 614, the measurement errors caused by, e.g., rotation of the sensor device 602 about its own axis, tipping over or capsizing of the sensor device 602, etc., can be reduced, compensated for, or cancelled out.

In an embodiment, the acoustic sensor 620 is not integrated with the main architecture of the sensors 608 and may be connected directly to a dedicated acoustic processor which amplifies, digitizes, and compresses the data and writes it to a dedicated memory, there being at least two memories in the system. The acoustic dedicated processor may be operatively connected to processor 626.

The sensor device 602 includes a memory 624 for storing measurements taken by the sensor(s) 608. The measurements include magnetic flux data and acceleration data.

The memory 624 may be any suitable form of data storage. In an embodiment, the memory 624 may include 1 Gb of Serial NOR Flash Memory. In other embodiments, the memory 624 may include other forms and sizes of computer-readable memory. The memory 624 may also be removable and/or swappable. For example, the memory 624 may be an SD or microSD card fitted to an appropriate interface.

The memory 624 may receive data directly from the sensor 608, or the memory 624 may communicate with sensor 608 via a processor 626.

When the memory 624 is full, the memory 624 may shut down the sensor device 602 automatically by signaling the memory status to the processor 626.

The sensor device 602 may have more than one memory 624. For example, the acoustic sensor 620 may have a dedicated memory of its own while the rest of the sensors may share another memory.

The sensor device 602 includes at least one internal connector 628 for communicating with the external device 606. The internal connector 628 connects the sensor device via wired or wireless connection to external devices (e.g., external connector 604, external device 606) for data transfer and communication. The internal connector 628 may be a communication interface for data communications with the external device 606. Accordingly, the internal connector 628 may communicate or transfer data stored in the memory 624 (e.g., sensor data, magnetic flux data) to the external device 606. The internal connector 628 may be a USB port. In an embodiment, the internal connector 628 may be a micro HDMI which connects to a USB (e.g. external connector 604).

The internal connector 628 is electrically connected to the processor 626. When the sensor device 602 is interfaced with the external connector 604, the processor 626 can be connected to the external device 606.

The sensor device 602 includes a power source 630 for providing power to the components of the sensor device 602. The power source 630 provides stored power to perform continuous measurements by the sensor 608. For example, the power source 630 may be a 3.7V lithium polymer rechargeable battery with approximately 165 mAh in charge which provide continuous sensing for around one hour or more. The power source 630 may also be one or more 3.6 V lithium thionyl chloride batteries with approximately 1200 mAh or 1500 mAh in charge which can provide continuous sending for around 24 hours or more. When the power source 630 is low on stored power, it may turn off the sensor device 602 automatically by sending a signal to the processor 626. The power source 630 may be chargeable through a set of conductors using an activator unit.

The power source 630 may be charged using the internal connector 628, and charging may occur when the sensor device 602 is interfaced with a cradle (which acts as a charging source and may include a data storage and facilitate transfer of the sensor data from the memory 624 to the cradle). The power source 630 may be charged by USB power. In some embodiments, a non-rechargeable power source may be used.

The power source 630 may be chargeable through a set of conductors with an activator unit or it may be charged through the internal connector 628 interfacing with the external connector 604. The charging circuitry may be within the external connector 604.

The sensor device 602 includes the processor 626 for performing logical operations. The processor 626 may include more than one processor. For example, the acoustic sensor 620 or magnetometer 610 may have a dedicated processor while the rest of the sensors within the sensor 608 may share another processor. The processor 626 may be an ATxmega128A4U-CU processor manufactured by Atmel or an ATSAME70021 processor manufactured by Microchip. The processor 626 may be reprogrammable (e.g. using instructions from external device 606) to change the capabilities and configuration of sensor device 602.

The processor 626 may be programmed to set the rate at which data is captured by sensor 608, and/or the time the sensor device 602 should wait before beginning to collect data using sensor 608. The processor 626 may also accept instructions to change the range of values that the sensor 608 should measure, and the number of bits that should represent each measurement. In other embodiments, an appropriate general-purpose processor (or a combination of such processors) may be used for the processor 626, and other instructions could be accepted by the processor 626. The processor 626 may also instead be implemented as a state machine to simplify the design and/or power consumption of sensor device 602.

The external device 606 may be a general-purpose computer that includes a USB port. In other embodiments, other ports can be used, depending on the ports available on an intermediary data transfer device. The external device 606 may be configurable to accept data from the sensor device 602 by way of the internal connectors 626. The external device 606 may include an interface for interfacing directly with the conductors 626 (e.g., jumper headers, an RS-232 serial port, a FireWire port, a USB port, etc.). The external device 606 may be able to instruct the processor 626 to erase data stored in the memory 624 (i.e., to make space for future data).

As previously described, the sensors 608 of the sensor device 602 may be mounted to a sensor platform. The sensor platform may include a plurality of sensor platforms, with different sensors 608 mounted to different sensor platforms. The sensor platform may include a printed circuit board. The sensor platform may also include a mounting component for mounting the sensor platform in the interior compartment of the sensor device 602. The mounting component may be an inner frame. The mounting component may be mounted or otherwise attached to an outer housing of the sensor device 602 via one or more connectors or fasteners or by other suitable means.

Also, as previously described herein, the sensors 608 each generally have a fixed position in the interior compartment with respect to the sensor device 602 (and to each other). For example, the fixed position may be established via mounting of the respective sensor to the sensor platform. In particular, the magnetometers 610 each have a fixed position. The fixed position of two magnetometers 610 define a separation distance or spacing between those two magnetometers which is fixed and thus can be used for determining absolute velocity of the sensor device 602 as described herein. In some cases, the separation distance between magnetometers 610 may be maximized with respect to design constraints in the interior compartment of the sensor device 602 (and the overall size of the sensor device), such as by positioning magnetometers 610 at or near the periphery of the sensor platform. This positioning of the magnetometers at a maximized distance may increase accuracy of the absolute velocity and other calculations described herein based on the magnetometer data (i.e., the absolute velocity is more accurate the further apart the magnetometers are). The magnetometers 610 may be positioned all in the same plane. The plane may correspond to a longitudinal axis of the fluid conduit or sensor device, or to a triangle shape. In an embodiment, one or more of the magnetometers 610 may be positioned out of plane from the other magnetometers in a pyramid style structure. For example, one or more magnetometers 610 may be positioned in a plane perpendicular to the longitudinal axis of the fluid conduit or sensor device. The IMU 632 may be positioned at or near the center of the sensor device 602 or the center of the sensor platform.

Figure 7:
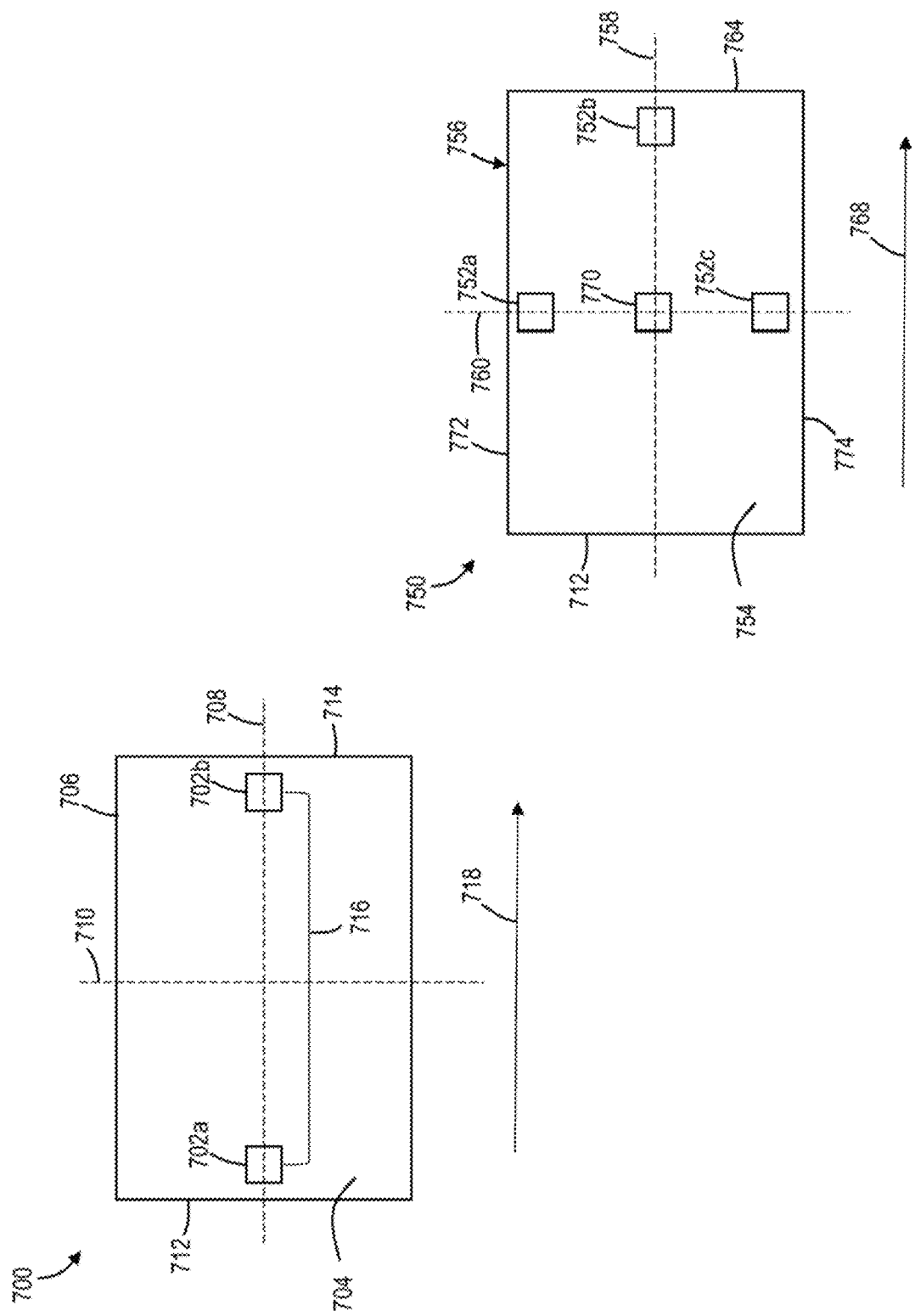
FIG. 7 is block diagram illustrating magnetometer positioning on a sensor platform, according to embodiments.

Referring now to FIG. 7, shown therein are example magnetometer layouts 700, 750 which may be used in a sensor device of the present disclosure, according to embodiments. In particular, layout 700 may be used in a non-free floating sensor device embodiment (e.g., mounted to a pig) and layout 750 may be used in a free floating sensor device embodiment. Layout 700 may also be used in a free-floating embodiment with additional sensors that are not shown. Layout 750 may also be used in a non-free floating sensor device embodiment. Layouts 700, 750 are merely examples and other layouts and configurations are contemplated.

Layout 700 includes first and second magnetometers 702a, 702b mounted on a first surface 704 of a sensor platform 706 at respective fixed positions. The sensor platform 706 may include a PCB board. First and second axes 708, 710 of the sensor platform 706, which are orthogonal to one another, are also shown.

As can be seen, first and second magnetometers 702a, 702b are positioned near respective opposing edges 712, 714 of the sensor platform. The fixed positions of the magnetometers 702a, 702b (e.g., defined by the center of the magnetometers) define a separation distance 716 between the magnetometers 702a, 702b.

While first and second magnetometers 702a, 702b are each positioned along the first axis 708 (i.e., at an equivalent position from the second axis 710), in other embodiments the magnetometers 702a, 702b may be positioned at different points along the first axis 708 or the second axis 710.

The first axis 708 may correspond to a longitudinal axis of the fluid conduit as the sensor device travels along the fluid conduit attached to the pig or similar device. For example, the orientation of the sensor platform 706 may be such that magnetometer 702b is a forward sensor as the sensor device travels along the fluid conduit and magnetometer 702a is a rear sensor. As such, magnetic signals are sensed by the magnetometer 702b before the magnetic signals are sensed by the magnetometer 702a (i.e., at a time delay). This would be the case where sensor platform 706 (as part of the sensor device) travels through the fluid conduit in direction 718.

Layout 750 includes magnetometers 752a, 752b, 752c mounted on a first surface 754 of a sensor platform 756 at respective fixed positions. Layout 750 also includes an IMU 770 mounted to the first surface of the sensor platform 756 at a fixed position.

First and second axes 758, 760 of the sensor platform 756, which are orthogonal to one another, are also shown.

It can be understood how the fixed positioning of the sensors 752a, 752b, 752c, 770 means that the separation distance between any two magnetometers (whether 752a, 752b, 752c, or of the IMU 770) is known and can thus be used to determine a time delay in the appearance of a magnetic signal in two magnetometers.

The sensor device, of which sensor platform 756 is a component, generally travels along the fluid conduit in flow direction 768. When the sensor device of which sensor platform 756 is a free-floating sensor device, the orientation of the sensor device, and thus of the sensor platform 756, may change as the device flows with the fluid flow (i.e. orientation is undefined).

Magnetometers 752a, 752c are positioned along second axis 760 near respective outer edges 772, 774 of the sensor platform 756.

Magnetometer 752b is positioned similarly to magnetometer 702b in layout 700 (i.e. near outer edge 764 of the sensor platform 756 along first axis 758).

IMU 770 is positioned at the center point of the first surface 754 of the sensor platform 756 corresponding to the intersection point of axes 758, 760. As such, the IMU 770 is also aligned with magnetometers 752a, 752c along second axis 760 and with magnetometer 752 along first axis 758. The position of the IMU 770 in the center of the sensor platform 756 may be better for vertical orientation determination. The magnetometers around the central axis may avoid variations due to them not being at the same spot in the fluid conduit when using a cleaning pig or similar device (i.e., when a sensor device using layout 750 is attached to a cleaning pig or the like). Now that the IMU 770 and magnetometers 752a, 752c are aligned, they can be used as verification, as the time difference between arrival of a magnetic signal in magnetometer 752a and the IMU 770 should be equal to the time difference between IMU 770 and magnetometer 752c.

In other configurations, IMU 770 may not include a magnetometer. In such cases, magnetometers 752a, 752b, 752c may be used instead. In other configurations, the IMU 770 may include a magnetometer and only two of the three magnetometers 752a, 752b, 752c are used or placed at a different location. As such, configurations using an IMU without a magnetometer and configurations having only two magnetometers in addition to a magnetometer-containing IMU on the sensor platform are contemplated.

When a sensor device having layout 750 is used on a pig or other conduit traveling device, magnetometers 752a and 752c are used for determining time delay. When a sensor device having layout 750 is used as a free-floating sensor device, magnetic flux data from each of magnetometers 752a, 752b, 752c, or two of the magnetometers and the magnetometer part of IMU 770, is used for determining horizontal orientation and time delay.

Figure 8:
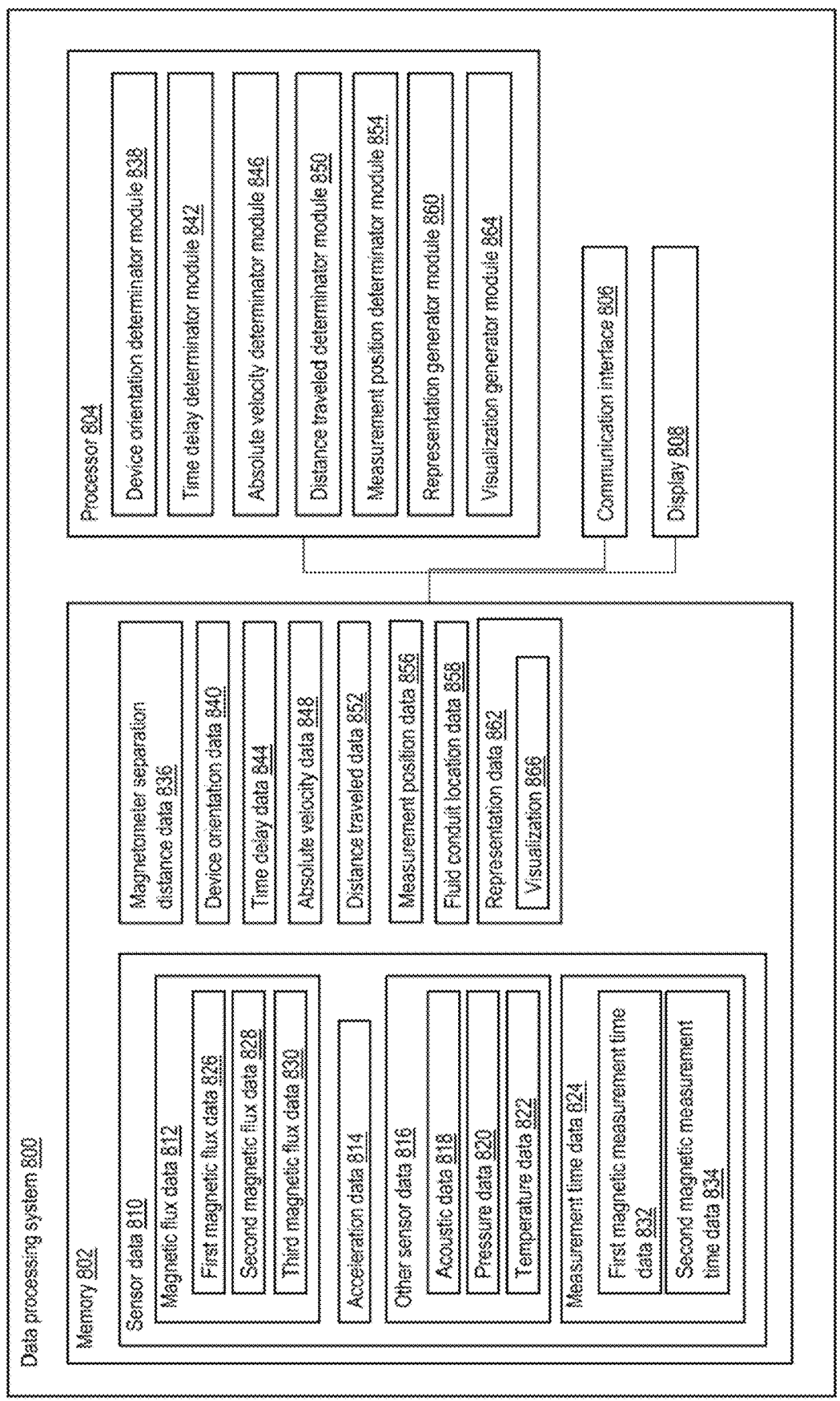
FIG. 8 is a block diagram of a data processing system for determining absolute velocity and position of a sensor device from magnetic flux data collected by the sensor device from an interior of a fluid conduit, according to an embodiment.

Referring now to FIG. 8, shown therein is a data processing system 800 for fluid conduit inspection, according to an embodiment.

The data processing system 800 may be the data processing system 136 of FIG. 1 or the external device 606 of FIG. 6. The system 800 may be configured to implement one or more steps or functions of the methods described herein, including methods 300, 400, 500 of FIGS. 3, 4, and 5, respectively.

The data processing system 800 is configured to determine an absolute velocity and, in the case of a free-floating sensor device embodiment, position of a sensor device using sensor data collected by the sensor device from inside the fluid conduit as the sensor device travels along a length of the fluid conduit.

The data processing system 800 includes a memory 802 for storing data and a processor 804 in communication with the memory 802 for processing data.

The processor 804 is configured to process data according to one or more modules comprising computer-executable instructions which, when executed by the processor 802, cause the data processing device 800 to perform the various functions described herein. The computer-executable instructions may be stored in the memory 802. The processor 804 may be configured to perform any of the data processing or determination processes described herein, such as those described in reference to FIGS. 3 to 5.

The data processing system 800 also includes a communication interface 806 for sending and receiving data to and from other devices capable of storing or processing data.

The data processing system 800 also includes a display 808 for displaying data, such as in a user interface.

The memory 802 stores sensor data 810. The sensor data 810 is data collected by one or more sensor devices from an interior of a fluid conduit. The sensor data 810 may be collected as the sensor device travels along a length of the fluid conduit.

The data processing system 800 receives the sensor data 810 via the communication interface 806 from another device capable of storing the sensor data 810. The other device may be the sensor device or may be an intermediary device (e.g., data transfer or storage device). The other device may be another computing device. The sensor data 810 may be received via wireless or wired connection.

The sensor data 810 includes magnetic flux data 812 measured by a plurality of magnetometers.

The sensor data 810 may also include acceleration data 814 measured by an accelerometer.

The sensor data 810 may also include other sensor data 816 collected by sensor types in the sensor device other than magnetic and acceleration sensors. Other sensor data 816 may include any one or more of acoustic data 818 measured by an acoustic sensor, rotation data (not shown) measured by a rotation sensor (gyroscope), pressure data 820 measured by a pressure sensor, and temperature data 822 measured by a temperature sensor.

The sensor data 810 also includes measurement time data 824. Measurement time data 824 may be associated with various sensor data 810. The measurement time data 824 is used to indicate at what time a particular measurement was recorded by the respective sensor. For example, the magnetic flux data 812 includes measurement time data 824 indicating when particular magnetic flux measurements were recorded by a particular magnetometer.

The magnetic flux data 812 includes first magnetic flux data 826, second magnetic flux data 828, and third magnetic flux data 830 corresponding to magnetic flux data 812 collected by a first magnetometer, second magnetometer, and third magnetometer of the sensor device, respectively. In some embodiments, the sensor device may include only two magnetometers and the magnetic flux data 812 may include only the first and second magnetic flux data 826, 828. In other embodiments, the sensor device may include more than three magnetometers and the magnetic flux data 812 further includes magnetic flux data corresponding to magnetic flux measurements collected by the additional magnetometer or magnetometers (e.g., fourth magnetic flux data collected by a fourth magnetometer).

The measurement time data 824 includes first magnetic measurement time data 832 corresponding to the first magnetic flux data 826 and second magnetic measurement time data 834 corresponding to the second magnetic flux data 828 and, where applicable, measurement time data for any additional magnetic flux data (e.g., third magnetic flux data from a third magnetometer).

The memory 802 also stores magnetometer separation distance data 836. The magnetometer separation distance data 836 includes a separation distance of the first and second magnetometers of the sensor device and any other potential magnetometers of the sensor device. The magnetometer separation distance data 836 may include other separation distances between magnetometers which may be used by the system 800. For example, the magnetometer separation distance data 836 may include any separation distance between two magnetometers in the sensor device.

The processor 804 includes a sensor device orientation determinator module 838.

The device orientation determinator module 838 determines a sensor device orientation using the acceleration data 814 and the magnetic flux data 812. The acceleration data 814 may be used to determine an orientation of the sensor device in a vertical plane. The magnetic flux data 812 may be used to determine an orientation of the sensor device in a horizontal plane.

The device orientation determinator module 838 may be configured to perform any one or more of step 416 of FIG. 4 and steps 504-516 of FIG. 5 to determine the orientation of the sensor device.

The device orientation determinator module 838 generates device orientation data 840 indicating an adjusted orientation of the sensor device. The device orientation data 840 is stored in the memory 802.

The device orientation determinator module 838 may be used in embodiments where the sensor device is free floating or has an undefined orientation as it travels along the fluid conduit. In embodiments where the sensor device has a defined orientation, such as when the sensor device is mounted to a pig, the system 800 may not include the device orientation determinator module 838.

The device orientation determination is performed by the orientation determinator module 838 a plurality of times for a plurality of acceleration and magnetic flux measurements in the acceleration data 814 and magnetic flux data 812. In this way, the device orientation can be corrected over the course of the measurement run.

The processor 804 includes a time delay determinator module 842 for determining a time delay between when a magnetic signal is recorded by a first magnetometer and a second magnetometer of the sensor device.

The time delay determinator module 842 determines a time delay in the measurement of a magnetic signal using the first and second magnetic flux data 826, 828 and the first and second magnetic measurement time data 832, 834.

Once a magnetic signal has been identified by the module 842 in the first and second magnetic flux data 826, 828, the respective time data 832, 834 associated with the magnetic flux measurements representing the magnetic signal can be compared (e.g. difference calculated) to determine a time delay.

The time delay determinator module 842 may be configured to perform the time delay determination as described in reference to FIGS. 3 and 4 (e.g., steps 316, 420).

The determined time delay is stored in the memory 802 as time delay data 844.

The time delay determinator module 842 may be configured to correspond or align the first and second magnetic flux data 826, 828 using the magnetic signals or magnetic signature, or such operation may be performed by a separate module (not shown), to enable the time delay determination.

The time delay determination is performed by the time delay determinator module 842 a plurality of times for a plurality of magnetic flux measurements in the magnetic flux data 826, 828. The time delay determination may also be applied to any other combination of magnetic flux data 812 in embodiments with more than two magnetometers (e.g. magnetometer 2 and 3, magnetometer 1 and 3, magnetometer 2 and 4 (if there is a fourth magnetometer).

The processor 804 includes an absolute velocity determinator module 846 for determining an absolute velocity of the sensor device.

The absolute velocity determinator module 846 determines an absolute velocity of the sensor device using the time delay data 844 and the magnetometer separation distance data 836.

The absolute velocity determinator module 846 may be configured to perform the absolute velocity determination as described in reference to FIGS. 3 and 4 (e.g. steps 320, 424).

Generally, the absolute velocity determinator module 846 may be configured to divide the separation distance data 836 by the time delay data 844 to obtain the absolute velocity.

The determined absolute velocity is stored in the memory 802 as absolute velocity data 848.

The absolute velocity determination is performed by the absolute velocity determinator module 842 to obtain a time series of absolute velocity values for the sensor device. The absolute velocity data 848 may thus include associated time components for each absolute velocity value.

The processor 804 includes a distance traveled determinator module 850 for determining a distance traveled by the sensor device using the absolute velocity of the sensor device. The determination using the absolute velocity may use the absolute velocity combined with other data and information obtained by the sensor device.

The distance traveled determinator module 850 determines a distance traveled of the sensor device using the absolute velocity data 848. Velocity may be only one parameter in the determination of distance. For example, other factors used may include elevation profile, joint pattern, hard markers such as risers, and any other information available about the fluid conduit.

The distance traveled determinator module 850 may be configured to perform the distance traveled determination as described in reference to FIGS. 3 and 4 (e.g. steps 324, 428).

Generally, the distance traveled determinator module 850 may be configured to integrate the absolute velocity data 848 (absolute velocity as a function of time) to obtain a distance traveled by the sensor device as a function of time. The distance travelled can be optimized or corrected at specific locations where other sensor data and information can be used in addition to the velocity data.

The determined distance traveled as a function of time (e.g. distance traveled value with associated time component) is stored in the memory 802 as distance traveled data 852.

The processor 804 also includes a measurement position determinator module 854 for determining a position or location along the length of the fluid conduit at which a particular sensor measurement was recorded.

The measurement position determinator module 854 determines a measurement position using the distance traveled data 852 and the sensor data 810. In particular, the measurement position determinator module 854 may correspond a particular sensor measurement (e.g., in data 812, 814, or 816) using the measurement time data 824 for the particular sensor measurement and the time data in the distance traveled data 852, such as by determining the measurement time of the measurement and using the measurement time to determine the distance traveled at the particular measurement time.

The measurement position determinator module 854 may be configured to perform the measurement position determination as described in reference to FIGS. 3 and 4 (e.g. steps 328, 432).

The determined measurement position is stored in the memory as measurement position data 856.

The measurement position determination may be performed for a plurality of sensor measurements to identify a position or location along the fluid conduit at which the measurement was recorded.

The measurement position determinator module 854 may be further configured to determine a fluid conduit location corresponding to the determined measurement position using a known start location of the sensor device measurement run (e.g. where the sensor device was inserted into the fluid conduit) and the distance traveled data 852. The known start location may be stored in the memory 802.

The fluid conduit location is stored in the memory 802 as fluid conduit location data 858.

The measurement position determinator module 854 may thus be used to identify a fluid conduit location at which a particular measurement, which may for example identify a leak or other anomaly or conduit feature, was recorded, providing insight into where there may be a problem with the fluid conduit.

The processor 804 also includes a representation generator module 860 for generating a human-readable electronic representation of data stored in the memory 802 or generated by the processor 804.

For example, any one or more of the absolute velocity data, 848, distance traveled data 852, measurement position data 856, fluid conduit location data 858, and the sensor data 810 may be represented in the electronic representation.

The electronic representation may be a graphical representation of data, such as a graphical plot of data points or time series. The electronic representation is stored in the memory 802 as representation data 862.

The processor 804 also includes a visualization generator module 864 for generating a visualization 866 of the representation data 862.

Generally, the visualization generator module 864 may be configured to generate a user interface including the visualization 864 of the representation data 862.

The visualization 866 may include one or more graphs displaying raw or processed sensor data, such as the graphs shown in FIG. 2 or similar. In an embodiment, the visualization 866 includes a graph plotting magnetic flux data against distance. The visualization 866 may highlight changes in absolute velocity or position of the sensor device. The visualization 866 presents the data in a human-readable format such that a human may review the data and consider subsequent action. The visualization 866 may also display the location at which a particular measurement, which may for example identify a leak or other anomaly or conduit feature, was recorded, providing insight into where there may be a problem with the fluid conduit.

The visualization 866 may be displayed by the display 808 such that the data displayed can be reviewed by a user such as the fluid conduit operator.

In variations, other software modules may be included in system 800 that are not shown in FIG. 8. Such modules may be implemented as a component of a module shown in FIG. 8 or as a separate module. Further, other data may be generated and/or stored in memory 802 that is not shown in FIG. 8.

For example, the computer system 800 may be configured to optimize determinations made by the distance traveled determinator module 850 (or other determinations by the processor 804) using markers identifiable in the sensor data and which may indicate a location of the marker along the fluid conduit. Markers may include, for example, an elevation change in the fluid conduit or a magnetic marker along the fluid conduit that has a characteristic and recognizable magnetic signature, such as a joint joining two segments of the fluid conduit (e.g., joint connecting two spool pieces of a fluid conduit). Data of such markers (e.g. elevation profile, joint pattern) may be provided as input to the distance traveled determinator module 850 to optimize determination of the distance traveled data 852.

In an embodiment, memory 802 may store reference elevation data for a geographic location or area of the fluid conduit. The reference elevation data may indicate an elevation profile for a geographic area in which the fluid conduit is located and may include elevation changes. In some cases, the processor 804 may be configured to cause the computer system 800 to retrieve the reference elevation data from an external source (computing device) via a data communication network (e.g., by requesting elevation data for a geographic area including the fluid conduit using coordinates defining the geographic area). In an embodiment, the reference elevation data may be Google Earth elevation data or the like. The memory 802 also stores pressure data 820. The pressure data 820 may record hydrostatic pressure changes indicative of an elevation change. The hydrostatic pressure changes indicative of an elevation change may be detectable in the pressure data 820 by the processor 804, such as by referencing historical pressure data stored in the memory indicating elevation changes or machine learning techniques (e.g., by detecting features in the pressure data 820 indicative of elevation changes). The processor 804 may be configured to overlay, reference, or compare the pressure data 820 to the reference elevation data in order to detect, identify, or confirm elevation changes in the fluid conduit and their respective locations along the fluid conduit between the sets of data (pressure and elevation). In doing so, the processor 804 may identify one or more elevation change markers along the length of the fluid conduit that can be used to optimize distance traveled determinations made by module 850 or in mapping the fluid conduit.

In another embodiment, the processor 804 may be configured to detect magnetic markers, such as joints, having a characteristic and recognizable magnetic signature by detecting the magnetic signature in the magnetic flux data 812. In the example of a joint, joints may give off different magnetic flux from the rest of the fluid conduit, which can be detected in the magnetic flux data 812. In an embodiment, the processor 804 may be configured to detect the magnetic marker by referencing historical magnetic flux data of magnetic signatures particular to a magnetic marker or by using machine learning techniques (e.g., by detecting features in the magnetic flux data 812 indicative of a particular class of magnetic marker). The processor 804 may map out location of the detected magnetic markers along the fluid conduit and the location of the magnetic markers may be used to optimize other determinations made by the processor 804, such as distance traveled by the sensor device (i.e., location of sensor device in the fluid conduit). This process may be performed independently of the absolute velocity and distance traveled determinations performed by the processor 804.

In some embodiments, the processor 804 may be configured to execute a sensor fusion module which fuses or combines various data inputs such as the absolute velocity data, detected magnetic marker data, and detected elevation marker data to determine the location of the sensor device in the fluid conduit or a condition of the fluid conduit.

Figure 9:
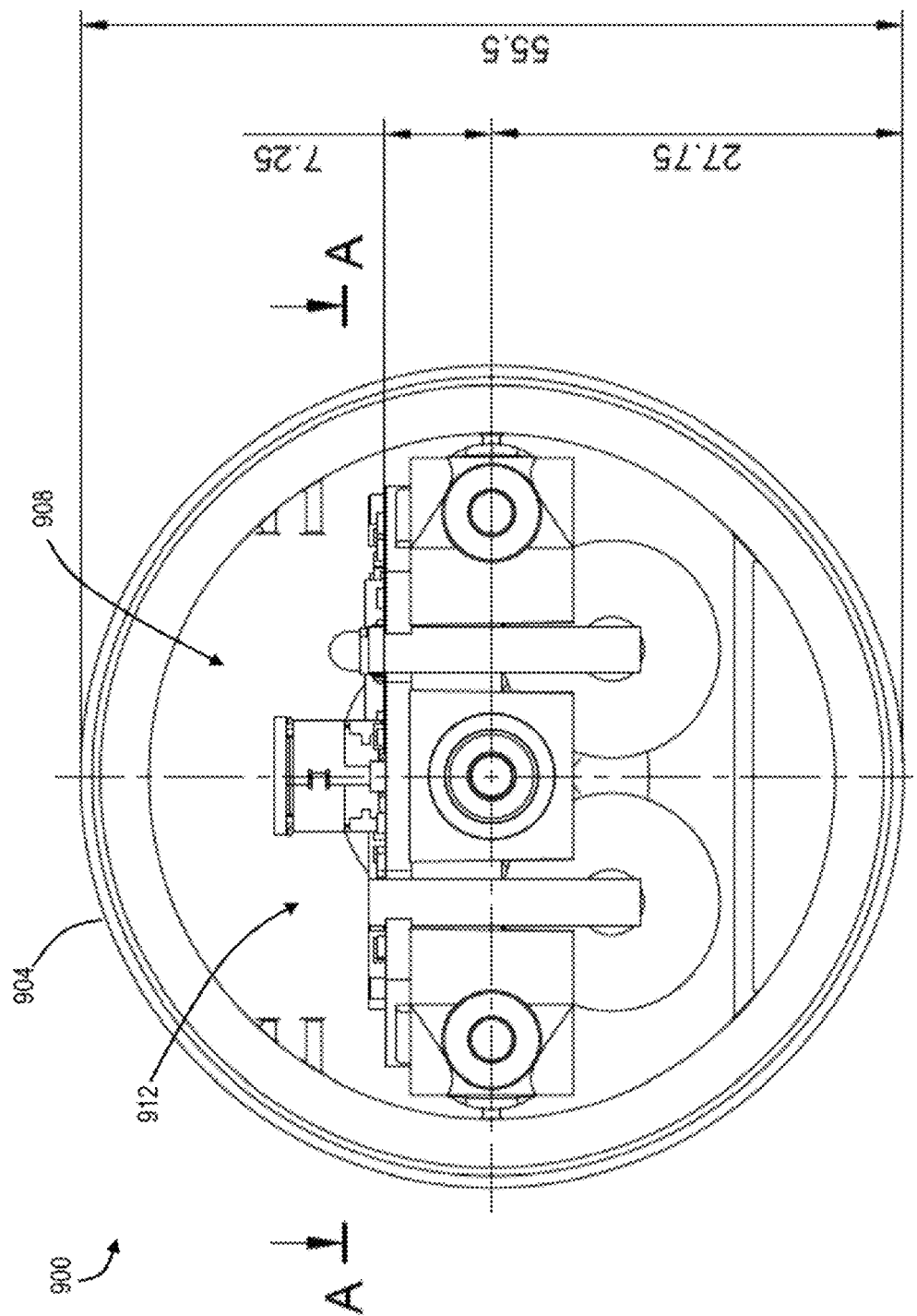
FIG. 9 is a side cross sectional view of a free-floating sensor device for fluid conduit inspection, according to an embodiment.

Referring now to FIG. 9, is a side cross sectional view of a free-floating sensor device 900 for fluid conduit inspection, according to an embodiment. The sensor device 900 may, for example, be the sensor device 122 of FIG. 1 or the sensor device 602 of FIG. 6.

The sensor device 900 is configured to be inserted into a fluid conduit and collect sensor data from the interior of the fluid conduit as the sensor device 900 flows with the fluid flow along a length of the fluid conduit.

The sensor device 900 includes an outer capsule 904 for providing fluid tight containment to an interior compartment 908.

The sensor device 900 also includes a sensing subsystem 912 disposed in the interior compartment 908. The sensor subsystem 912 includes various components for measuring, processing, and storing sensor data and operating the sensor device. The sensor subsystem 912 also includes structural support components for providing structural support to various components of the sensor subsystem 912.

FIG. 9 also illustrates various dimensions of the sensor device 900. All such dimensions are in millimeters. The sensor device may have other dimensions.

Figure 10:
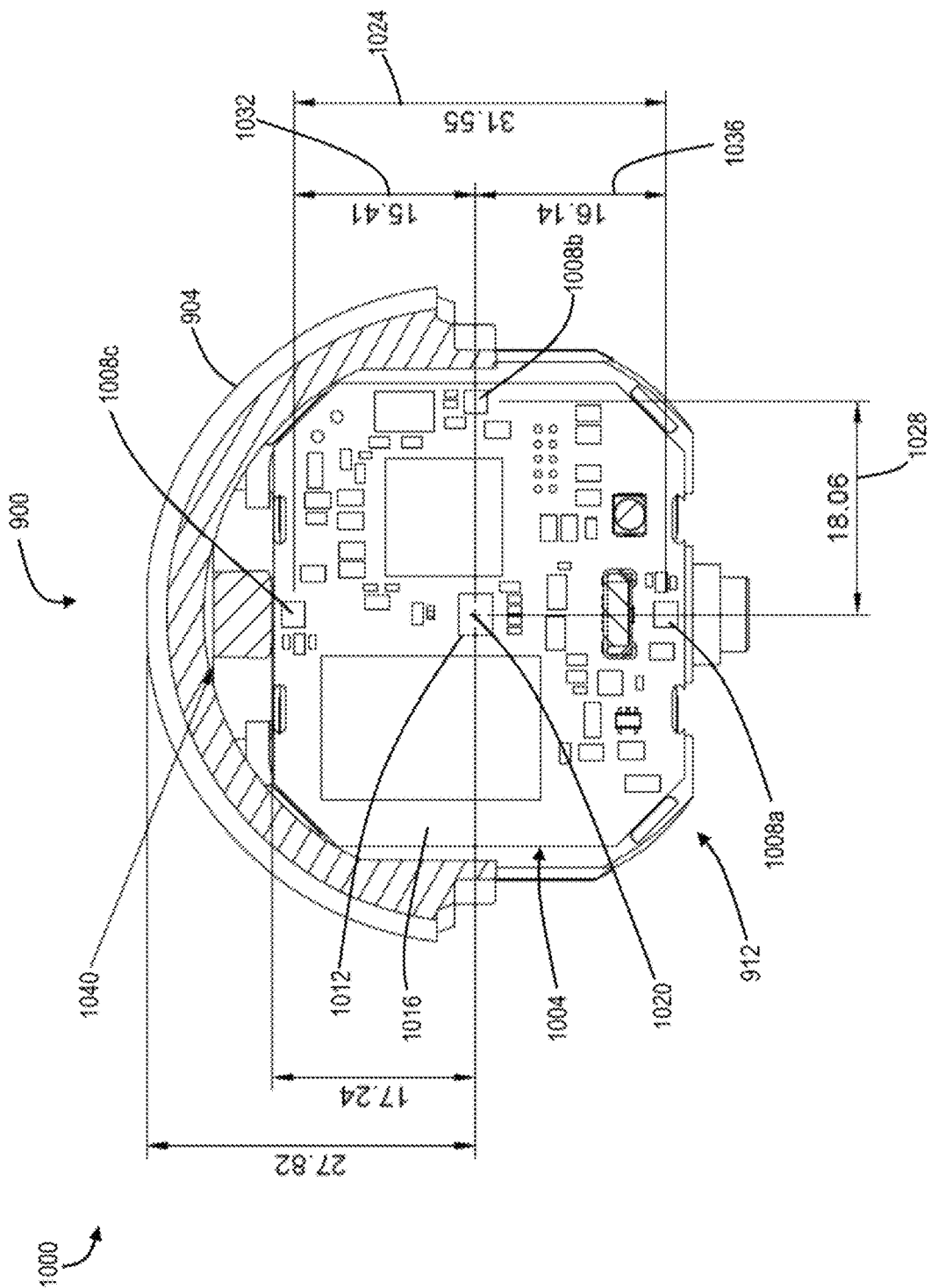
FIG. 10 is a top cross sectional partly cut away view of the sensor device of FIG. 9 along lines A-A.

Referring now to FIG. 10, shown therein is a top cross sectional partly cut away view 1000 of the sensor device 900 of FIG. 9, according to an embodiment.

The sensing subsystem 912 includes a sensor platform 1004. The sensing subsystem 912 also includes magnetometers 1008a, 1008b, 1008c and an IMU (including an accelerometer and magnetometer) 1012 mounted on a first surface 1016 of the sensor platform 1004. As previously described, in variations, the sensing subsystem 912 may include fewer or more magnetometers and/or an IMU without a magnetometer.

The mounting of the sensors 1008a, 1008b, 1008c, 1012 to the first surface 1016 of the sensor platform 1004 establishes respective fixed positions of the sensors 1008a, 1008b, 1008c, 1012 relative to one another.

The IMU 1012 is mounted at a center position 1020 of the first surface 1016.

As can be seen, the magnetometers 1008a, 1008b, 1008c are positioned near the periphery or edges of the sensor platform 1004 (e.g., to increase distance therebetween).

In another embodiment, the sensor device 900 may include a fourth magnetometer mounted to the first surface 1016 of the sensor platform 1004 at a position in line with the magnetometer 1008b and IMU 1012 at a distance equal (or about equal) to the separation distance of the IMU 1012 and the magnetometer 1008b. For example, the four magnetometers may be arranged to make a "+" sign, with the IMU 1012 at the center.

The fixed positions of the sensors 1008a, 1008b, 1008c, 1012 define separation distances between any two sensors 1008a, 1008b, 1008c, 1012, which may be stored by a data processing system and used to perform various calculations and determinations as described herein.

Magnetometer 1008a and magnetometer 1008c have a separation distance 1024 of 31.55 mm. IMU 1012 and magnetometer 1008b have a separation distance 1028 of 18.06 mm. Magnetometer 1008c and IMU 1012 have a separation distance 1032 of 15.41 mm. Magnetometer 1008a and IMU 1012 have a separation distance 1036 of 16.14 mm. Various other sensor device 900 dimensions are also shown in FIG. 10 (in mm). These dimensions are an example, and, in other embodiments, the dimension and distances may be different.

The sensing subsystem 912 may also include a pressure/temperature sensor 1040.

Figure 11:
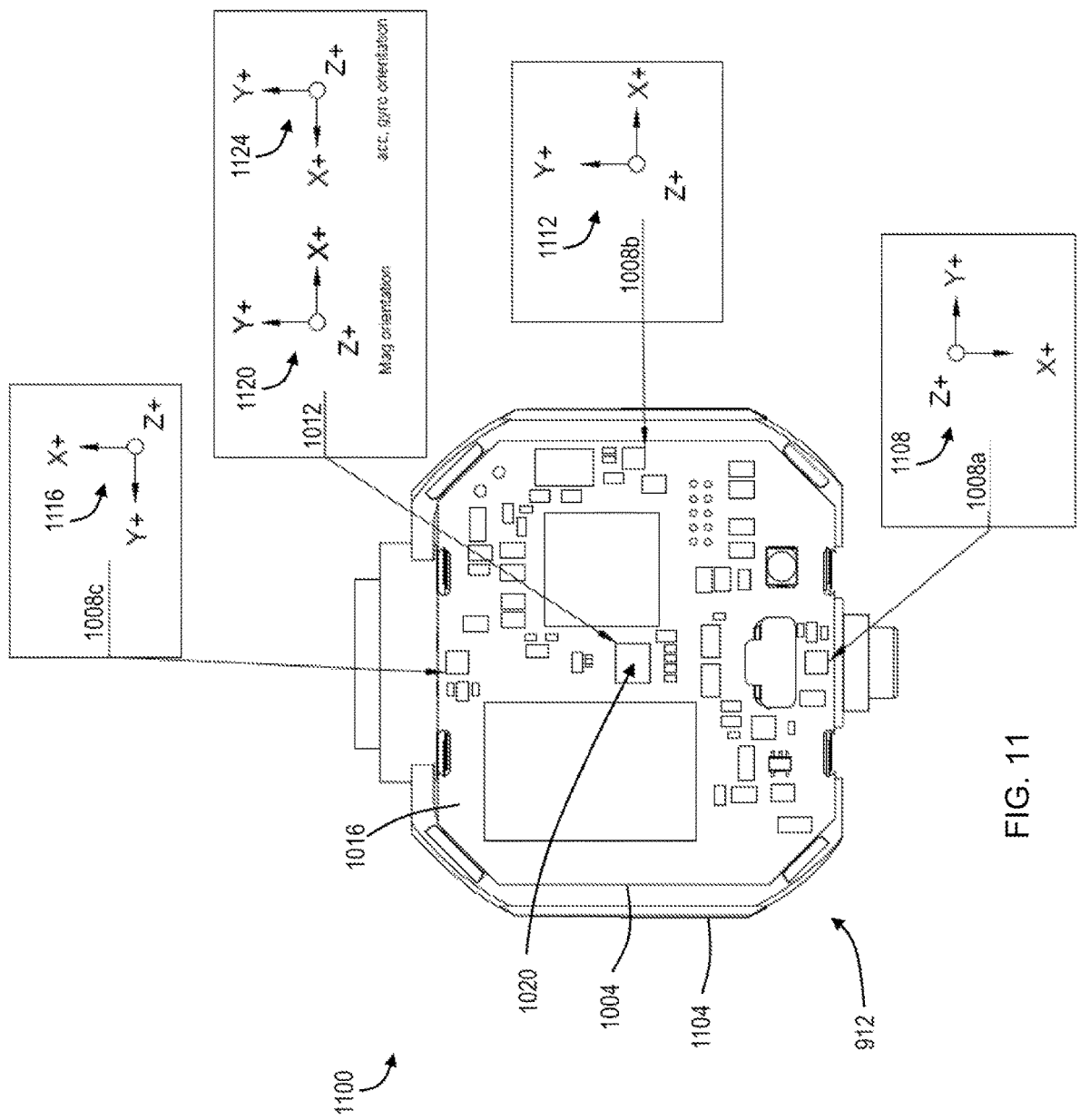
FIG. 11 is a top view of the sensor platform of FIG. 10 in isolation.

Referring now to FIG. 11, shown therein is a top view 1100 of the sensor platform 1004 of FIG. 10 in isolation.

The sensor platform 1004 is mounted to a frame component 1104. The frame component 1104 provides structural support to the sensor platform 1004.

FIG. 11 also illustrates various sensor orientations in the sensor device 900. Magnetometer 1008a includes magnetometer orientation 1108. Magnetometer 1008b includes magnetometer orientation 1112. Magnetometer 1008c includes orientation 1116. The IMU 1012 includes magnetometer orientation 1120 and accelerometer orientation 1124. As can be seen, the orientations 1112, 1120 of the magnetometer 1008b and IMU 1012 magnetometer are the same. In variations, the magnetometers 1008 may have different orientations, provided the orientations are known.

Figure 12:
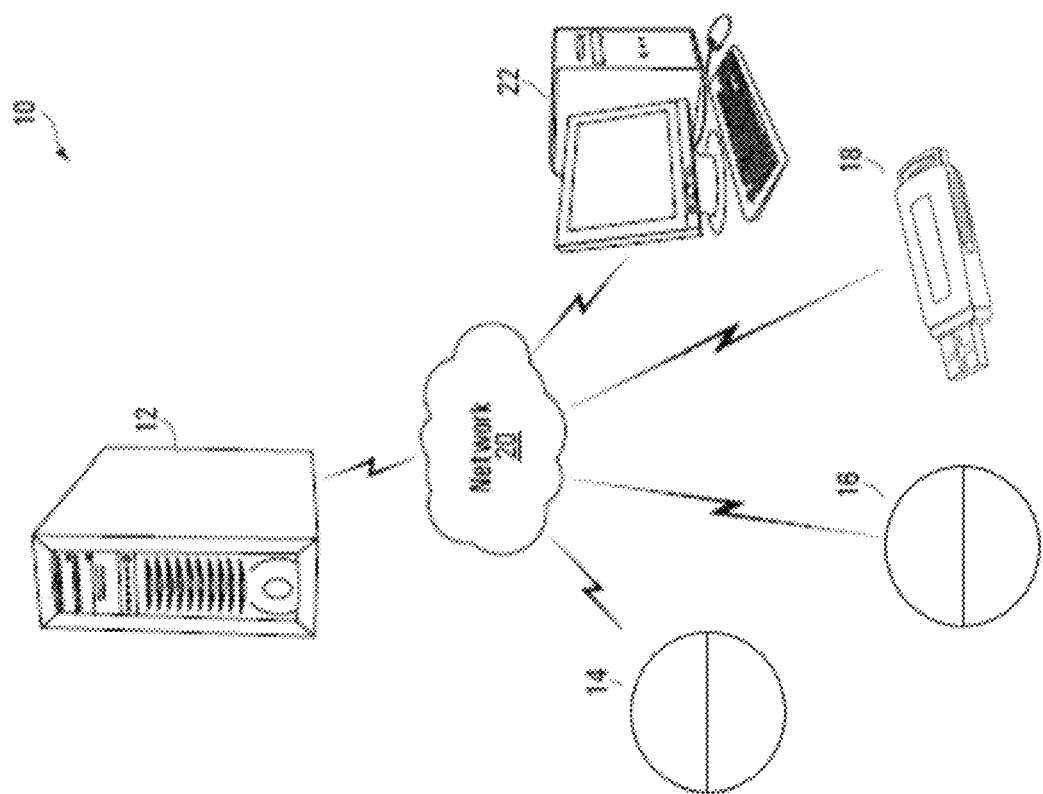
FIG. 12 is a block diagram illustrating a system for determining absolute velocity and position of a sensor device in a fluid conduit, according to an embodiment.

Referring now to FIG. 12, shown therein is a block diagram illustrating a system 10 for determining absolute velocity and position of a sensor device in a fluid conduit, according to an embodiment.

The system 10 may also determine a distance traveled by the sensor device using the absolute velocity, and a measurement position of a sensor measurement collected by the sensor device using the distance traveled.

The system 10 includes a data processing server 12, which communicates with a plurality of sensor devices 14, 16, an intermediate data transfer device 18, and a data receiving device 22 via a network 20. The server 12 may receive sensor data from the sensor devices 14, 16 and the intermediary data transfer device 18. The server 12 may analyze the received sensor data. The data receiving device 22 may receive data from the server 12 to output the data to a user, for example via a user interface presented on a display device. The data receiving device 22 may be associated with an operator of a fluid conduit being inspected by the sensor devices 14, 16. The intermediary data transfer device 18 may receive sensor data from the sensor devices 14, 16 and transmit the sensor data to the server 12.

The server 12, and devices 18 and 22 may be a server computer, desktop computer, notebook computer, tablet, PDA, smartphone, or another computing device. The intermediary data transfer device 18 may be a memory card reader, flash memory device, USB storage device, or the like. The devices 12, 14, 16, 18, 22 may include a connection with the network 20 such as a wired or wireless connection to the Internet. In some cases, the network 20 may include other types of computer or telecommunication networks. The devices 12, 14, 16, 18, 22 may include one or more of a memory, a secondary storage device, a processor, an input device, a display device, and an output device. Memory may include random access memory (RAM) or similar types of memory. Also, memory may store one or more applications for execution by a processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network 20.

Input device may include any device for entering information into device 12, 14, 16, 18, 22. For example, input device may be a keyboard, key pad, cursor-control device, touch-screen, camera, or microphone. Display device may include any type of device for presenting visual information. For example, display device may be a computer monitor, a flat-screen display, a projector, or a display panel. Output device may include any type of device for presenting a hard copy of information, such as a printer for example. Output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18, 22 are described with various components, one skilled in the art will appreciate that the devices 12, 14, 16, 18, 22 may in some cases contain fewer, additional or different components. In addition, although aspects of an implementation of the devices 12, 14, 16, 18, 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or processor to perform a particular method.

Devices such as server 12 devices 14, 16, 18 and 22 can be described performing certain acts. It will be appreciated that any one or more of these devices may perform an act automatically or in response to an interaction by a user of that device. That is, the user of the device may manipulate one or more input devices (e.g., a touchscreen, a mouse, or a button) causing the device to perform the described act. In many cases, this aspect may not be described below, but it will be understood.

As an example, it is described below that the devices 14, 16, 18, 22 may send information to the server 12. For example, a user using the device 22 may manipulate one or more inputs (e.g., a mouse and a keyboard) to interact with a user interface displayed on a display of the device 22. Generally, the device may receive a user interface from the network 20 (e.g., in the form of a webpage). Alternatively or in addition, a user interface may be stored locally at a device (e.g. a cache of a webpage or a mobile application).

Server 12 may be configured to receive a plurality of information, from each of the plurality of devices 14, 16, 18, 22.

In response to receiving information, the server 12 may store the information in a storage database. The storage may correspond with secondary storage of the devices 14, 16, 18 and 22. Generally, the storage database may be any suitable storage device such as a hard disk drive, a solid state drive, a memory card, or a disk (e.g. CD, DVD, or Blu-ray etc.). Also, the storage database may be locally connected with server 12. In some cases, storage database may be located remotely from server 12 and accessible to server 12 across a network for example. In some cases, storage database may comprise one or more storage devices located at a networked cloud storage provider.

Figure 13:
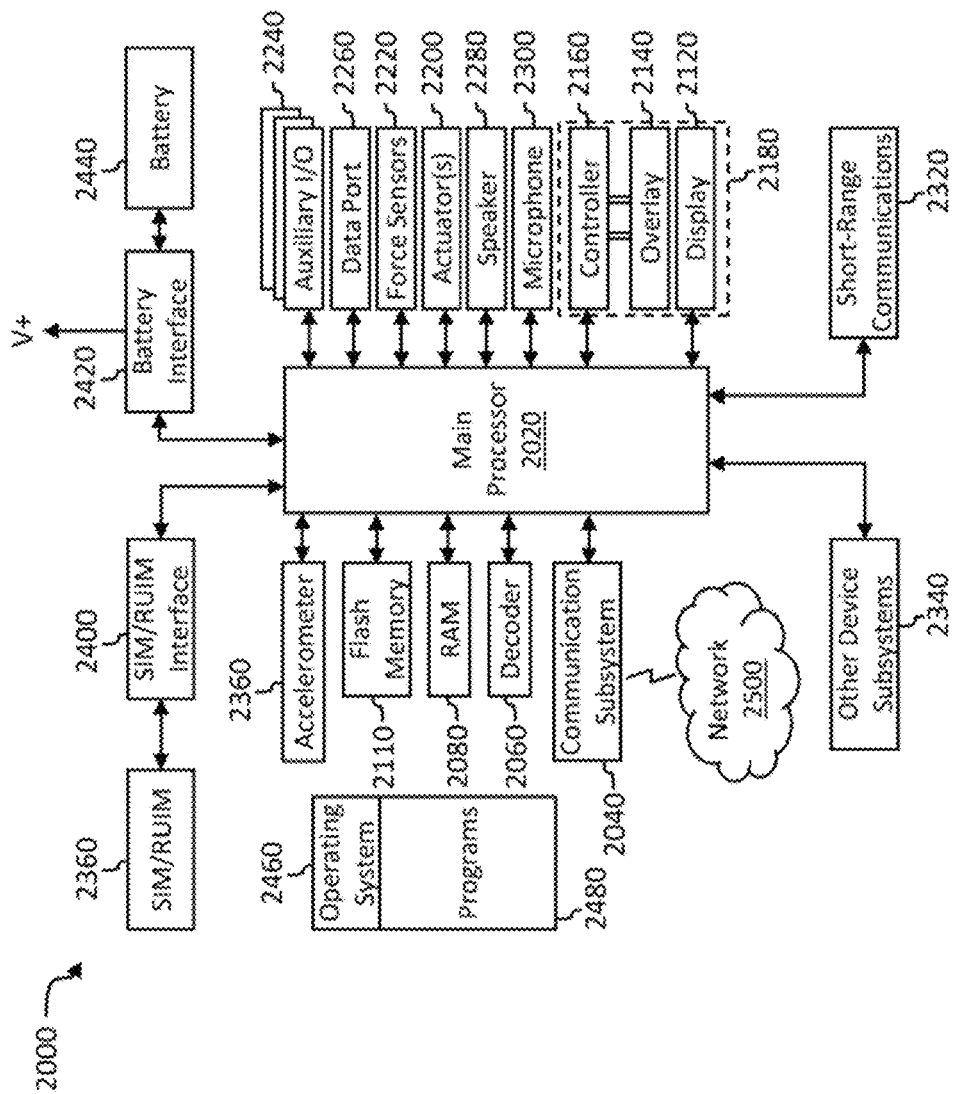
FIG. 13 is a simplified block diagram of components of a computing device of FIG. 12, according to an embodiment.

Referring now to FIG. 13, shown therein is a simplified block diagram of components of a computing device 2000, according to an embodiment. The device 2000 may be a data processing device (e.g., system 136 of FIG. 1, system 800 of FIG. 8), intermediary data transfer device, or a data receiving device as described herein. The device 2000, or components thereof, may be present in the devices of FIG. 12.

The device 2000 includes multiple components such as a processor 2020 that controls the operations of the device 2000. Communication functions, including data communications, voice communications, or both may be performed through a communication subsystem 2040. Data received by the device 2000 may be decompressed and decrypted by a decoder 2060. The communication subsystem 2040 may receive messages from and send messages to a network 2500. The network 2500 may be a wireless network. In other embodiments, the network 2500 may be a wired network. The use of a wired network may better facilitate transfer of the large amounts of data collected and generated by the fluid conduit inspection system.

The wireless network 2500 may be any type of wireless network, including, but not limited to, data-centric wireless networks, voice-centric wireless networks, and dual-mode networks that support both voice and data communications. The device 2000 may be a battery-powered device and as shown includes a battery interface 2420 for receiving one or more rechargeable batteries 2440.

The processor 2020 also interacts with additional subsystems such as a Random Access Memory (RAM) 2080, a flash memory 2110, a display 2120 (e.g. with a touch-sensitive overlay 2140 connected to an electronic controller 2160 that together comprise a touch-sensitive display 2180), an actuator assembly 2200, one or more optional force sensors 2220, an auxiliary input/output (I/O) subsystem 2240, a data port 2260, a speaker 2280, a microphone 2300, short-range communications systems 2320 and other device subsystems 2340.

In some embodiments, user-interaction with the graphical user interface may be performed through the touch-sensitive overlay 2140. The processor 2020 may interact with the touch-sensitive overlay 2140 via the electronic controller 2160. Information, such as text, characters, symbols, images, icons, and other items that may be displayed or rendered on a portable electronic device generated by the processor 2020 may be displayed on the touch-sensitive display 2180.

The processor 2020 may also interact with an accelerometer 2360 as shown in FIG. 13. The accelerometer 2360 may be utilized for detecting direction of gravitational forces or gravity-induced reaction forces.

To identify a subscriber for network access according to the present embodiment, the device 2000 may use a Subscriber Identity Module or a Removable User Identity Module (SIM/RUIM) card 2360 inserted into a SIM/RUIM interface 2400 for communication with a network (such as the network 2500). Alternatively, user identification information may be programmed into the flash memory 2110 or performed using other techniques.

The device 2000 also includes an operating system 2460 and software components 2480 that are executed by the processor 2020 and which may be stored in a persistent data storage device such as the flash memory 2110. Additional applications may be loaded onto the device 2000 through the wireless network 2500, the auxiliary I/O subsystem 2240, the data port 2260, the short-range communications subsystem 2320, or any other suitable device subsystem 2340.

For example, in use, a received signal such as a text message, an e-mail message, web page download, or other data may be processed by the communication subsystem 2040 and input to the processor 2020. The processor 2020 then processes the received signal for output to the display 2120 or alternatively to the auxiliary I/O subsystem 2240. A subscriber may also compose data items, such as e-mail messages, for example, which may be transmitted over the network 2500 through the communication subsystem 2040.

For voice communications, the overall operation of the portable electronic device 2000 may be similar. The speaker 2280 may output audible information converted from electrical signals, and the microphone 2300 may convert audible information into electrical signals for processing.

Figure 14:
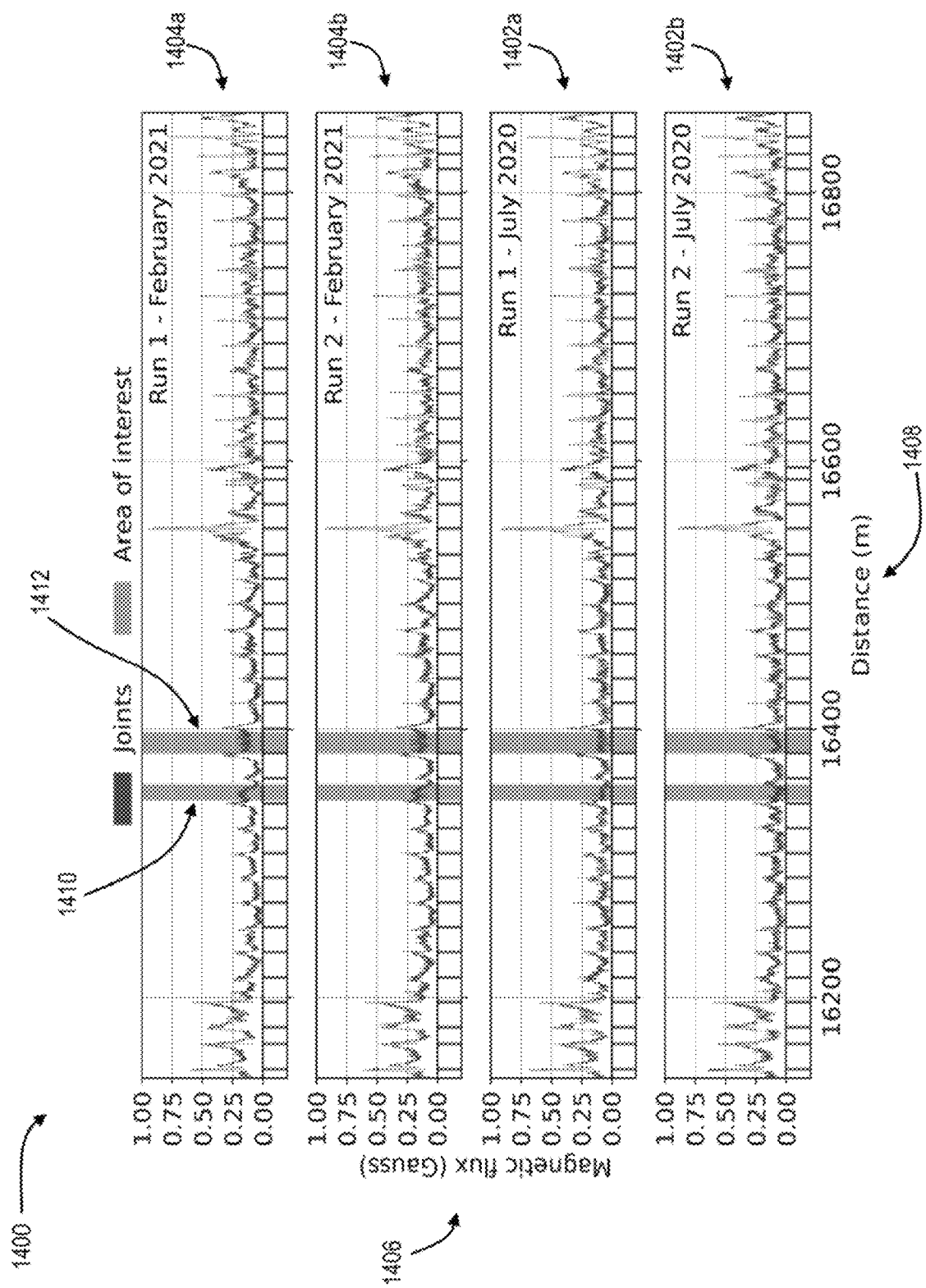
FIG. 14 is a graphical representation of magnetic flux data collected by a sensor device of the present disclose over a length of fluid conduit during two sets of two measurement runs separated by seven months, illustrating general repeatability of the magnetic flux data and detection of differences in magnetic flux data across measurement runs.

Referring now to FIG. 14, shown therein is a graphical representation 1400 of magnetic flux data collected from a fluid conduit with a sensor device (e.g., sensor device 122 of the system 100 of FIG. 1) over four different measurement runs 1402a, 1402b, 1404a, 1404b, illustrating repeatability of magnetic flux data and detection of a difference between magnetic flux data across measurement runs.

The data illustrated in FIG. 14 is data that may be generated, processed, and analyzed using the system 100 of FIG. 1. For example, the graphical representation 1400 may be generated by the data processing device 136 of FIG. 1.

The four measurement runs 1402a, 1402b, 1404a, 1404b correspond to measurements taken over the same stretch of fluid conduit. The magnetic flux data is visualized as a plot of magnetic flux 1406 against distance 1408.

The four measurement runs include a first pair of measurement runs including first measurement run 1402a and second measurement run 1402b. First and second measurement runs 1402a, 1402b were performed in July 2020.

The four measurement runs also include a second pair of measurement runs including third measurement run 1404a and fourth measurement run 1404b. Third and fourth measurement runs 1404a, 1404b were performed in February 2021.

Generally, the approach represented by the data shown in FIG. 14 is to perform two runs close together in time (e.g., runs 1402a, 1402b), wait a period of time (e.g. the period is 7 months in FIG. 14, but could be shorter or longer) and then perform another two runs close together in time (e.g. runs 1404a, 1404b), where the pairs of runs are over the same stretch of pipeline. Data from the sets of measurement runs can then be compared to identify differences.

As can be seen, the data across most of the run is the same or very similar for the runs 1402a, 1402b, 1404a, 1404b, illustrating the repeatability of the magnetic flux data.

Two areas of interest 1410, 1412 have been identified in the magnetic flux data. The areas of interest 1410, 1412 have been identified in each measurement run 1402a, 1402b, 1404a, 1404b. As can be seen, while the magnetic flux measurements in areas of interest 1410, 1412 are the same within the same measurement run pair (e.g., 1402a and 1402b are similar, 1404a, 1404b are similar), the magnetic flux measurements between pairs of measurement runs (i.e. runs 1402a, 1402b vs, 1404a, 1404b) show a change. The change in magnetic flux in the areas of interest 1410, 1412 may be detected by the data processing system 136 analyzing the magnetic flux data. This may include, for example, aligning the data across measurement runs and identifying changes in magnetic flux measurements that fall outside of a predetermined threshold. In some cases, the data processing system 136 may be configured to identify the areas of interest 1410, 1412 in the magnetic flux data and then graphically identify the detected areas of interest on a visualization of the magnetic flux data across measurement runs, such as shown in FIG. 14.

While the above description provides examples of one or more apparatus, methods, or systems, it will be appreciated that other apparatus, methods, or systems may be within the scope of the claims as interpreted by one of skill in the art.

What is claimed is systems, methods, and devices as generally and as specifically described herein.

The invention claimed is:

1. A computer system for fluid conduit inspection, the computer system comprising:
   a memory, storing:
      sensor data collected by a sensor device during a measurement run from an interior of a fluid conduit while traveling along a length of the fluid conduit, the sensor data including:
         magnetic flux data comprising first magnetic flux data collected by a first magnetometer of the sensor device and second magnetic flux data collected by a second magnetometer of the sensor device, the first and second magnetometers each having a respective fixed position in the sensor device; and
      magnetometer separation distance data corresponding to a separation distance between the respective fixed positions of the first and second magnetometers;
   a processor in communication with the memory, the processor configured to:
      determine a plurality of time delay values over the measurement run, each time delay value determined by identifying a time delay between when a magnetic signal is present in the first magnetic flux data and when the magnetic signal is present in the second magnetic flux data;
      determine an absolute velocity of the sensor device for each of the plurality of time delay values using the magnetometer separation distance data and the respective time delay value to obtain a plurality of absolute velocity values for the sensor device over the measurement run, each of the plurality of absolute velocity values having associated time data indicating a time at which the sensor device had the respective absolute velocity value; and generate distance traveled data from the absolute velocity values and associated time data, the distance traveled data indicating a distance traveled by the sensor device during the measurement run at a particular time.

2. The computer system of claim 1, wherein the processor is further configured to optimize the distance traveled data using additional sensor data about the fluid or the fluid conduit.

3. The computer system of claim 1, wherein the processor is further configured to use the distance traveled as a function of time to determine a sensor measurement position for a particular sensor measurement in the sensor data from the distance traveled data by corresponding a time value associated with the sensor measurement with a time value from the distance traveled as a function of time, the sensor measurement position indicating where along the length of the fluid conduit the sensor measurement was recorded.

4. The computer system of claim 1, wherein the sensor data further includes acceleration data collected by an accelerometer and third magnetic flux data collected by a third magnetometer in the sensor device, and wherein the processor is further configured to determine an orientation of the sensor device using the acceleration data and the magnetic flux data and rotate a frame of reference of the sensor device using the determined orientation.

5. The computer system of claim 4, wherein the processor determines the orientation of the sensor device and rotates the frame of reference of the sensor device by:
determining a vertical plane orientation of the sensor device towards earth gravity force using the acceleration data and filtering out a force of the earth gravity force;
rotating the frame of reference of the sensor device such that gravity points down to establish direction in the vertical plane using a continuous factor of the earth gravity force;
determining a horizontal plane orientation using the relative strengths of the same magnetic signal in the first, second, and third magnetic flux data or using the time delay of the same magnetic signal between the first, second, and third magnetic flux data; and
performing a coordinate frame transformation to point the horizontal plane orientation forward.

6. The computer system of claim 1, wherein the sensor data further includes acceleration data collected by an accelerometer and third magnetic flux data collected by a third magnetometer in the sensor device, and wherein the processor is configured to: determine a vertical orientation of the sensor device using the acceleration data and a horizontal orientation of the sensor device using the magnetic flux data; adjust a frame of reference of the sensor device using the determined vertical and horizontal orientations; and determine the plurality of time delay values using the adjusted frame of reference.

7. The computer system of claim 1, wherein the processor is further configured to map a sensor device position to a sensor measurement collected by the sensor device using the distance traveled data, the sensor device position indicating a position along the fluid conduit at which the sensor device collected the sensor measurement.

8. The computer system of claim 1, wherein the processor determines the plurality of time delay values over the measurement run by aligning the first magnetic flux data and the second magnetic flux data using a time warping technique to identify aligned magnetic flux data points and determining the time delay value between aligned magnetic flux data points.

9. The computer system of claim 1, wherein the sensor data includes pressure data collected by a pressure sensor of the sensor device, and wherein the processor is further configured to optimize the distance traveled data using the pressure data and reference elevation data for a geographic location of the fluid conduit.

10. The computer system of claim 9, wherein the processor is further configured to retrieve the reference elevation data from an external computing device via a data communication network.

11. The computer system of claim 1, wherein the processor is further configured to determine presence and location of a magnetic marker along the fluid conduit having a characteristic and recognizable magnetic signature by detecting the magnetic signature in the magnetic flux data and optimize the distance traveled data using the determined location of the magnetic marker.

* * * * *